US010769448B2

(12) United States Patent
Shinohara et al.

(10) Patent No.: US 10,769,448 B2
(45) Date of Patent: Sep. 8, 2020

(54) SURVEILLANCE SYSTEM AND SURVEILLANCE METHOD

(71) Applicant: Panasonic i-PRO Sensing Solutions Co., Ltd., Fukuoka (JP)

(72) Inventors: Toshiaki Shinohara, Fukuoka (JP); Yoshito Touzawa, Toyama (JP); Toru Terada, Ishikawa (JP)

(73) Assignee: Panasonic i-PRO Sensing Solutions Co., Ltd., Fukuoka (JP)

( * ) Notice: Subject to any disclaimer, the term of this patent is extended or adjusted under 35 U.S.C. 154(b) by 64 days.

(21) Appl. No.: 15/987,814

(22) Filed: May 23, 2018

(65) Prior Publication Data
US 2018/0349709 A1 Dec. 6, 2018

(30) Foreign Application Priority Data

May 31, 2017 (JP) .................... 2017-108163
May 31, 2017 (JP) .................... 2017-108164

(51) Int. Cl.
| | |
|---|---|
| G06K 9/00 | (2006.01) |
| G06T 7/11 | (2017.01) |
| H04N 7/18 | (2006.01) |
| G06K 9/66 | (2006.01) |
| H04N 5/232 | (2006.01) |

(Continued)

(52) U.S. Cl.
CPC .......... *G06K 9/00771* (2013.01); *G06K 9/66* (2013.01); *G06T 7/11* (2017.01); *G06T 7/70* (2017.01); *H04N 5/23203* (2013.01); *H04N 5/23206* (2013.01); *H04N 5/247* (2013.01); *H04N 7/181* (2013.01); *G06T 2207/20084* (2013.01); *G06T 2207/20132* (2013.01); *G06T 2207/30232* (2013.01)

(58) Field of Classification Search
CPC ...... G06K 9/00771; G06K 9/66; G06K 9/325; G06K 9/00228; G06K 9/00221; G06K 9/00684; G06K 9/00711; H04N 5/23203; H04N 7/181; H04N 7/188; G06T 7/292; G06T 7/50; G06T 7/11
See application file for complete search history.

(56) References Cited

U.S. PATENT DOCUMENTS 5,579,442 A * 11/1996 Kimoto ................ B25J 9/161
                                                              318/568.11
7,822,508 B2 * 10/2010 Sugiyama ............ B25J 9/1612
                                                              318/568.12

(Continued)

FOREIGN PATENT DOCUMENTS

JP          2016-206795 A      8/2016
JP          2016206795 A   * 12/2016 ............... G06T 7/20

*Primary Examiner* — Dramos Kalapodas
(74) *Attorney, Agent, or Firm* — Seed IP Law Group LLP

(57) ABSTRACT

In a surveillance system, a server and a plurality of cameras provided in a surveillance area are communicably connected to each other. The server includes a table memory that retains information on free resources of each of cameras. The server determines for each camera, a process to be executed by the camera, based on the information on the free resources of the camera, and transmits an instruction to execute the determined process to each camera. Each of the cameras executes a process corresponding to the instruction to execute, based on an instruction to execute the process transmitted from the server.

21 Claims, 18 Drawing Sheets

(51) Int. Cl.
*H04N 5/247* (2006.01)
*G06T 7/70* (2017.01)

(56) References Cited

U.S. PATENT DOCUMENTS

| | | | | |
|---|---|---|---|---|
| 8,760,519 | B2* | 6/2014 | Ozdemir | G08B 13/19608 |
| | | | | 348/135 |
| 9,704,054 | B1* | 7/2017 | Tappen | G06K 9/46 |
| 9,916,493 | B2* | 3/2018 | Begeja | G06K 9/00221 |
| 2002/0038294 | A1* | 3/2002 | Matsugu | G06N 3/063 |
| | | | | 706/20 |
| 2012/0069131 | A1* | 3/2012 | Abelow | G06Q 10/067 |
| | | | | 348/14.01 |
| 2015/0002665 | A1* | 1/2015 | Sentinelli | G06K 9/00771 |
| | | | | 348/143 |
| 2015/0071190 | A1* | 3/2015 | Lau | H04W 72/1226 |
| | | | | 370/329 |
| 2016/0048741 | A1* | 2/2016 | Nguyen | G06K 9/6256 |
| | | | | 382/159 |
| 2016/0292512 | A1* | 10/2016 | Kanna | G06K 9/6215 |
| 2017/0278289 | A1* | 9/2017 | Marino | G06T 7/44 |
| 2017/0310881 | A1* | 10/2017 | Sevin | H04N 5/23216 |
| 2017/0351940 | A1* | 12/2017 | Mazzarella | G06N 20/00 |
| 2018/0091778 | A1* | 3/2018 | Chen | H04L 69/40 |

* cited by examiner

SURVEILLANCE SYSTEM AND SURVEILLANCE METHOD

BACKGROUND

1. Technical Field

The present disclosure relates to a surveillance system in which a server and a plurality of cameras provided in a surveillance area are communicably connected to each other, and a surveillance method.

2. Description of the Related Art

Currently, it is said that the arithmetic processing capability of a camera is 0.3 tera (T) ops. Tera (T) is a value indicating 10 to the twelfth power. Ops is known as a unit indicating the arithmetic processing capability. In the future, it is considered that high-performance graphics processing unit (GPU) and field programmable gate array (FPGA) mounted on game machines or the like are adopted for use in the arithmetic processor of the camera. In that case, for example, one year later, it is expected that the arithmetic processing capability of the camera will dramatically improve to about 2.6 Tops, which is ten times or more.

In a case where the camera performs an image recognition process using deep learning as an example of machine learning, it is pointed out that 1.3 Tops is required for the arithmetic processing capability of the camera. Although it has been considered that it is difficult for the camera to perform an image recognition process using deep learning in view of the high arithmetic processing capability in the related art, it is considered that the image recognition process by using deep learning can be performed sufficiently with the arithmetic processing capability of the camera one year later.

On the other hand, in the case where the captured image data of high image quality (for example, 4 K) captured by the camera is transferred to the server and the server performs the image recognition process, as the size of the captured image data increases, the communication amount (traffic) transferred on a network inevitably increases, which results in lower communication efficiency and delay. Therefore, it is expected that the camera performs an image recognition process using deep learning without transferring a captured image data of a high image quality (for example, 4 K).

Generally, in the case of performing an image recognition process using deep learning, a device such as a camera learns an object (that is, an object to be recognized) included in captured image data and updates the learning model by changing a model parameter (for example, a weighting coefficient or a threshold value) used in the image recognition process. A device such as a camera improves the accuracy of detecting an object (that is, an object to be recognized) included in captured image data, based on the updated learning model.

An object tracking apparatus disclosed in Japanese Patent Application Laid-Open No. 2016-206795, for example, has been proposed as a related art for recognizing an object using captured image data captured by a camera and acquiring object motion information. The object tracking apparatus uses an image group of time series acquired from a camera capable of capturing an object to perform learning by a teacher data set including image information on the acquired image and object motion information which is position information on the position of the object in the real space and is regarded as a correct answer. The object tracking apparatus uses a tracking discriminator that outputs position information that is regarded as a correct answer of at least the object in the real space by inputting image information on the image for each image of the object tracking target, and acquires the momentary position information of the object in the real space.

In the future, it is expected that the captured image data handled by the camera will be high definition and large capacity of 4 K, 8 K, or the like, and the data size will increase. With such increase in the size of the captured image data, in the case where learning of the parameters used for detecting the captured image data is performed by the server instead of the camera, the processing load is concentrated in the server, and furthermore, by transmitting a large amount of data to the server one by one, the traffic on the network increases, causing a problem that a corresponding delay occurs at the time of data communication. Regarding the technical countermeasure against such a problem, no special consideration has been made in the related art as in Japanese Unexamined Patent Publication No. 2016-206795.

SUMMARY

The present disclosure has been devised in view of the above-described circumstances in the related art, an object is to provide a surveillance system and a surveillance method in which when detecting at least one object in each captured image captured by a plurality of cameras installed in the surveillance area, a process such as learning of parameters used for the detection is distributed among the plurality of cameras, it is possible to suppress an increase in traffic on the network and to support the reduction of the processing load of the server connected to the plurality of cameras.

According to the present disclosure, there is provided a surveillance system including a server; and a plurality of cameras provided in a surveillance area, in which the server and the cameras are communicably connected to each other, the server includes a memory that retains in a memory information on processing capability of each of the cameras and a captured image obtained by capturing the surveillance area by each of the cameras, determines for each camera, a process to be executed by the camera with respect to detection of at least one object appearing in the captured image obtained by each camera, based on information on the processing capability of the camera, and transmits an instruction to execute the determined process to each of the cameras, and each of the cameras executes a process corresponding to the instruction to execute, based on the instruction to execute the process transmitted from the server.

According to the present disclosure, there is provided a surveillance method using a surveillance system in which a server and a plurality of cameras provided in a surveillance area are communicably connected to each other, the method including by the server retaining in a memory information on processing capability of each of the cameras and a captured image obtained by capturing the surveillance area by each of the cameras, determining for each camera, a process to be executed by the camera with respect to detection of at least one object appearing in the captured image obtained by each camera, based on information on the processing capability of the camera, and transmits an instruction to execute the determined process to each of the cameras, and by each of the cameras executing a process corresponding to the instruction to execute, based on the instruction to execute the process transmitted from the server.

According to the present disclosure, when detecting at least one object in each captured image captured by a plurality of cameras installed in the surveillance area, a process such as learning of parameters used for the detection is distributed among the plurality of cameras, it is possible to suppress an increase in traffic on the network and to support the reduction of the processing load of the server connected to the plurality of cameras.

DETAILED DESCRIPTION

Process Leading to Exemplary Embodiment 1

In the future, it is expected that the captured image data handled by the camera will be high definition and large capacity of 4 K, 8 K, or the like, and the data size will increase. With such increase in the size of the captured image data, in the case where learning of the parameters used for detecting the captured image data is performed by the server instead of the camera, the processing load is concentrated in the server, and furthermore, by transmitting a large amount of data to the server one by one, the traffic on the network increases, causing a problem that a corresponding delay occurs at the time of data communication. Regarding the technical countermeasure against such a problem, no special consideration has been made in the related art as in Patent Document 1.

Therefore, in Exemplary Embodiment 1, a description is given about a surveillance system and a surveillance method in which when detecting at least one object in each captured image captured by a plurality of cameras installed in the surveillance area, a process such as learning of parameters used for the detection is distributed among the plurality of cameras, it is possible to suppress an increase in traffic on the network and to support the reduction of the processing load of the server connected to the plurality of cameras.

Exemplary Embodiment 1

Figure 1:
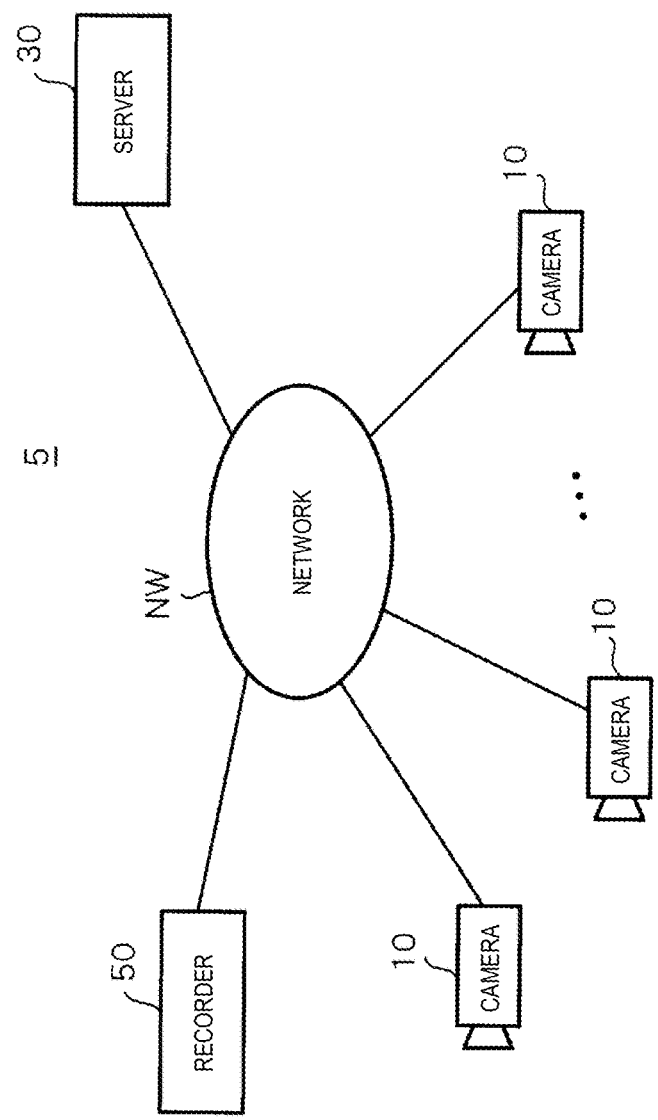
FIG. 1 is a block diagram showing an example of a system configuration of a surveillance system of Exemplary Embodiment 1.

FIG. 1 is a block diagram showing an example of a system configuration of a surveillance system 5 of Exemplary Embodiment 1.

Surveillance system 5 is, for example, a surveillance system for crime prevention, and is provided in indoor places such as a bank, a store, a company, and a facility, or outdoor places such as a parking lot and a park. The surveillance area of surveillance system 5 is indoor places such as a bank, a store, a company, and a facility, or outdoor places such as a parking lot and a park. Surveillance system 5 of the present exemplary embodiment is configured to include at least one camera 10 that recognizes at least one object appearing in a captured image by using an artificial intelligence (AI) technology, server 30, and recorder 50. At least one camera 10, server 30, and recorder 50 are communicably connected to each other through a network NW.

Hereinafter, in a case where it is necessary to distinguish plural cameras 10 from each other, cameras are expressed as 10A, 10B, 10C, . . . . Plural cameras 10 may be installed, for example, at the same place in the building as a surveillance area, or some cameras 10 may be installed at different places from the other cameras 10. Here, it is assumed that the installation statuses (for example, the installation angle and the angle of view of the camera) of cameras 10A, 10B, 10C installed in different places as the surveillance area are the same. For example, each of cameras 10A, 10B, 10C is attached to the wall so as to be located above the entrance and exit where the automatic door is installed, and captures images while looking down the person entering and leaving the entrance from slightly above. The installation status of each of cameras 10A, 10B, 10C is not limited to the case where it is located at the entrance and exit where the automatic door is installed.

First of all, with respect to learning for generating a neural network (in other words, a learning model) used for deep learning as an example of machine learning of an artificial intelligence (AI) technology and detection (that is, inference) for inputting data to a learned learning model (hereinafter referred to as "learned model") and outputting the result, the outline will be described.

Figure 2:
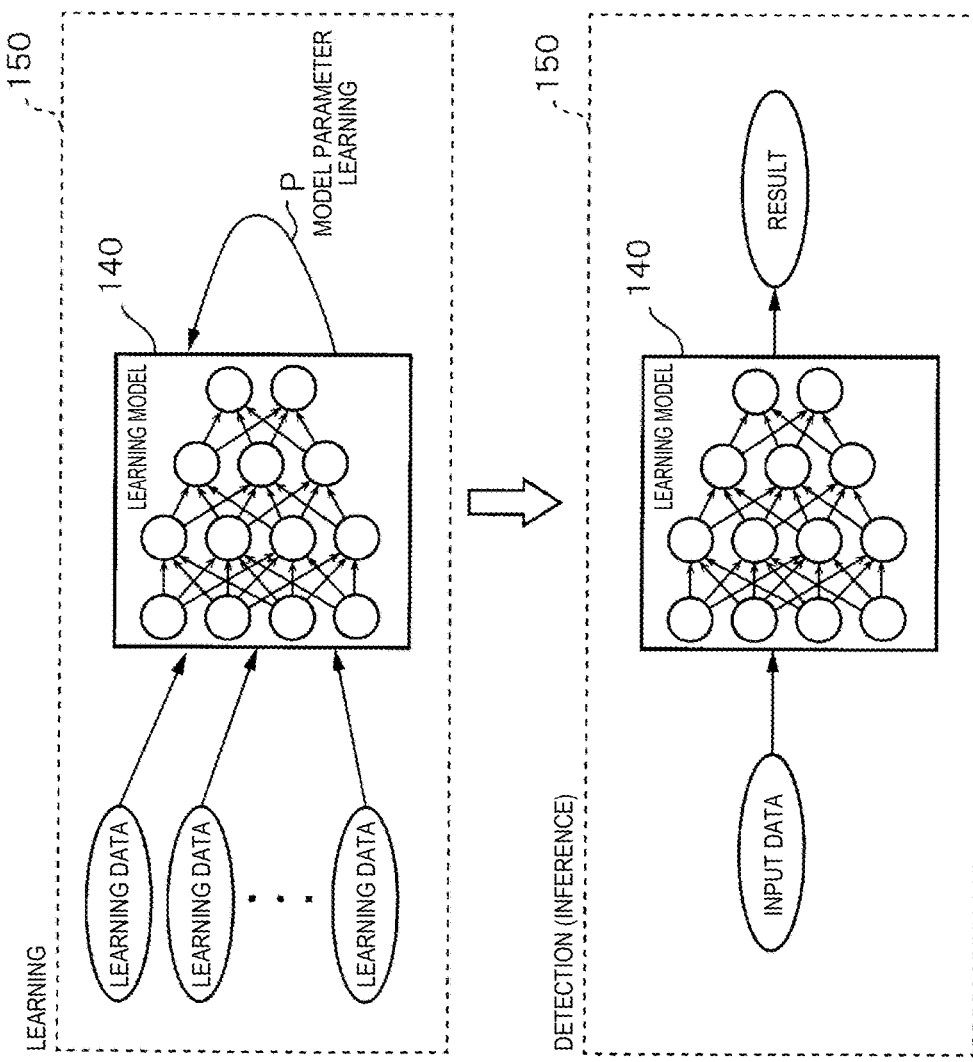
FIG. 2 is an explanatory diagram of an outline example of learning and detection.

FIG. 2 is an explanatory diagram of an outline example of learning and detection.

The learning process (hereinafter simply referred to as "learning") is a process performed by deep learning as an example of machine learning of an artificial intelligence (AI) technology, for example. In other words, learning is performed using deep learning in a neural network (hereinafter abbreviated as "NN") attracting attention in recent years, as one of machine learning. In machine learning by deep learning, "supervised learning" using teacher data and "unsupervised learning" without using teacher data are performed. As a result of machine learning, a learned model is generated. On the other hand, detection is a process of inputting data to the generated learned model and obtaining a result.

Learning may be performed in real time, but since it requires a lot of computation processing, it is usually done offline (that is, asynchronous). On the other hand, a detection process (hereinafter simply referred to as "detection") is usually performed in real time. Further, the device on which learning is performed may be, for example, any of camera 10, server 30, and recorder 50, and here, a case where learning is performed in camera 10 is shown. On the other hand, the detection is performed in camera 10. Even if the captured image data captured by camera 10 is transferred to server 30 or recorder 50, in a case where traffic on network NW does not occur, server 30 or recorder 50 may perform detection.

At the time of learning, device 150 inputs a large amount of learning data (for example, image data captured by camera 10). Device 150 performs machine learning (for example, a deep learning process) based on the input learning data, and updates model parameter P of neural network (NN 140) which is a learning model. Model parameter P is a weighting coefficient (that is, a bias), a threshold value, or the like, which is set in each of a plurality of neurons constituting NN 140. When performing machine learning (for example, a deep learning process), device 150 acquires correctness for each learning data or calculates an evaluation value (that is, a score) using the teacher data. Device 150 changes the learning degree of model parameter P according to whether the learning data is correct or false or the score is high or low. After learning, NN 140 is used as a learned model for detection in device 150.

At the time of detection (that is, at the time of inference), device 150 inputs input data (for example, captured image data captured in real time by camera 10), executes inference at NN 140, and outputs an inference result obtained by execution (that is, the determination result of the detected object). The determination result includes, for example, information on a regular report or a false report according to the presence or absence of the object included in the captured image data, and information on a score indicating the evaluation value of the object. A regular report is a report indicating that an object is correctly detected with high accuracy when detecting the object. A false report is a report indicating that an object is erroneously detected with high accuracy when detecting the object.

Figure 3:
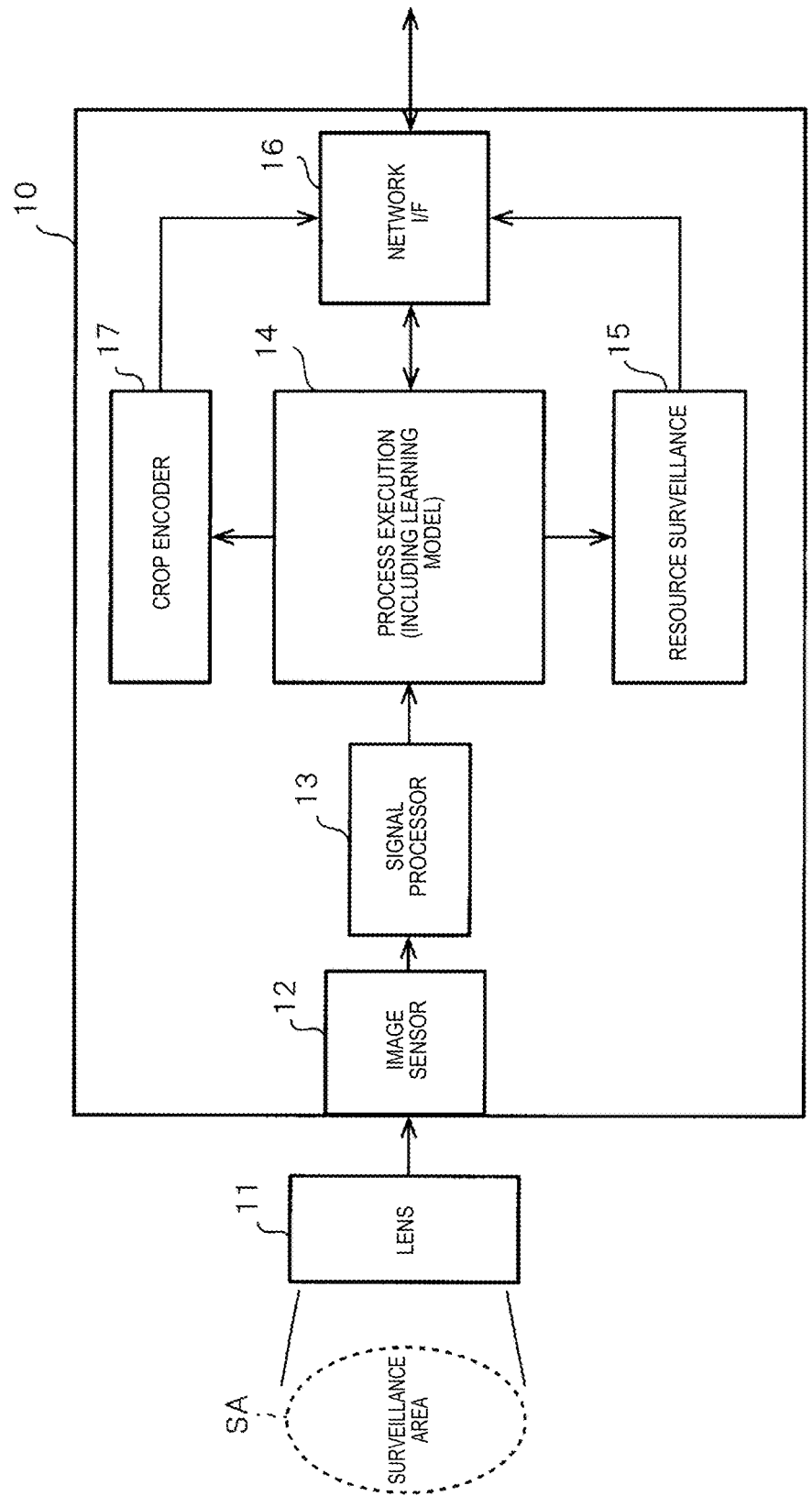
FIG. 3 is a block diagram illustrating in detail an example of the internal configuration of a camera of Exemplary Embodiment 1.

FIG. 3 is a block diagram illustrating in detail an example of the internal configuration of camera 10 of Exemplary Embodiment 1.

For example, camera 10 captures a subject image in the surveillance area and acquires captured image data. Specifically, camera 10 is configured to include lens 11, image sensor 12, signal processor 13, process execution 14, resource surveillance 15, crop encoder 17, and network I/F 16.

Through lens 11 disposed so that a subject image from surveillance area SA can be incident thereon, camera 10 forms an incident subject image from surveillance area SA on image sensor 12, and image sensor 12 converts the subject image (that is, the optical image) into an electrical signal for capturing. At least lens 11 and image sensor 12 constitute a capture of camera 10. Camera 10 uses the electric signal obtained by image sensor 12 to generate RGB signals in signal processor 13, or generate captured image data by performing various predetermined image processes such as white balance and contrast adjustment, and outputs the RGB signals or the captured image data.

Process execution 14 is configured with, for example, a graphics processing unit (GPU) or a field programmable gate array (FPGA). In future, as GPUs or FPGAs with high performance and high arithmetic processing capabilities are adopted as processors of camera 10, the computation processing capability of camera 10 dramatically improves, so that it is expected that a deep learning process can be sufficiently executed in camera 10. Process execution 14 includes a learning model or a learned model as NN 140 generated or updated by executing a process in the GPU or FPGA, and outputs the determination result of at least one object appearing in the captured image, for the input captured image data.

Resource surveillance 15 monitors information on the processing capability of camera 10 (for example, the amount of free resources) based on the usage status of the GPU, the FPGA, the memory, or the like in process execution 14.

At the time of detection, crop encoder 17 cuts out some objects appearing in the captured image data and outputs the objects as captured image data to be processed or thumbnail data.

Network I/F 16 controls connection with network NW. Camera 10 transmits to server 30 or recorder 50 through network I/F 16, the determination result of the object output from process execution 14, the amount of free resource monitored by resource surveillance 15, thumbnail data, and the like. Further, camera 10 receives model parameter P which is the result of learning from server 30, recorder 50, and another camera 10 through network I/F 16.

Figure 4:
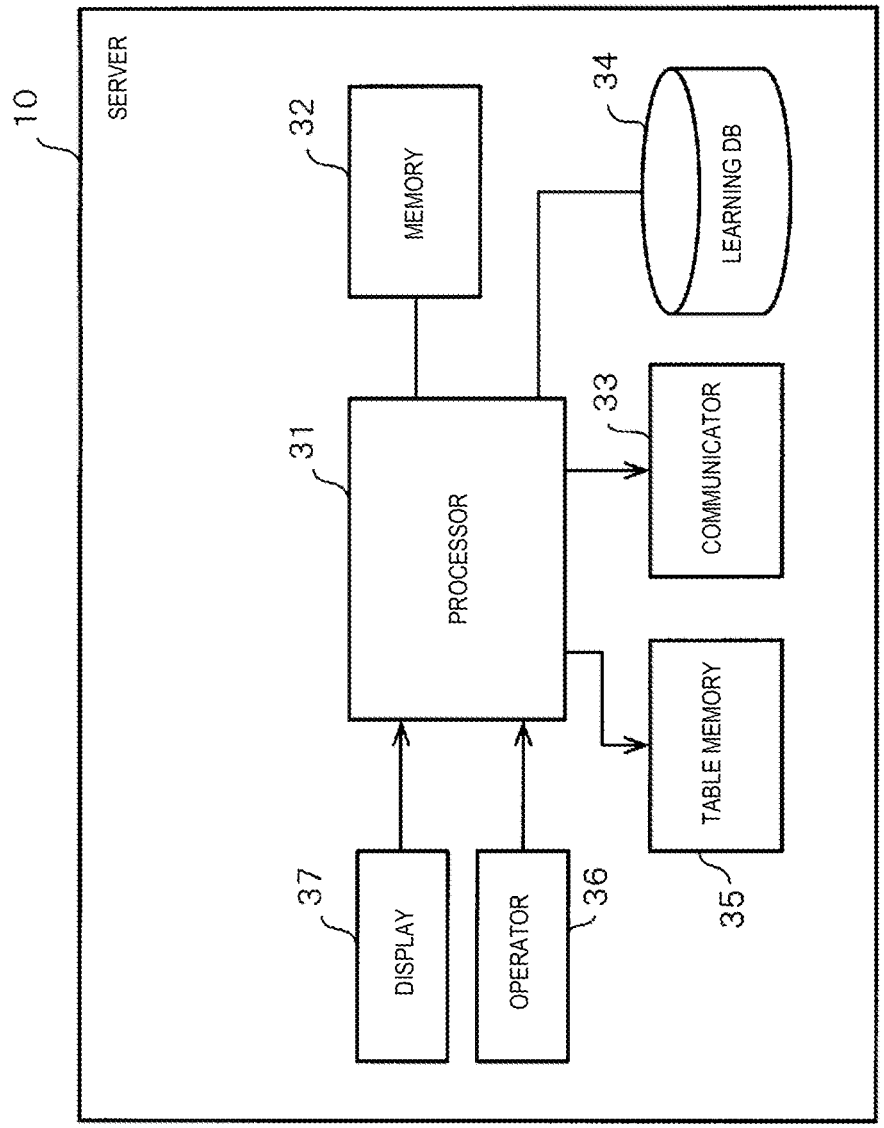
FIG. 4 is a block diagram illustrating in detail an example of the internal configuration of a server of Exemplary Embodiment 1.

FIG. 4 is a block diagram illustrating in detail an example of the internal configuration of server 30 of Exemplary Embodiment 1.

Server 30 is configured to include a processor (for example, a central processing unit (CPU), a micro processing unit (MPU), or a digital signal processor (DSP)) 31, memory 32, communicator 33, operator 36, display 37, learning database (DB) 34, and table memory 35. In cooperation with memory 32, processor 31 comprehensively executes processing and control of each unit of server 30. Memory 32 includes a nonvolatile memory and a volatile memory. The nonvolatile memory stores information on the unit cost of each of cameras 10A, 10B, 10C (for example, information on the power cost of each of cameras 10A, 10B, 10C) notified from, for example, plural cameras 10A, 10B, 10C. The information on the power cost is an index value indicating how much power amount (that is, cost) is to be applied as a result, for example, how much cameras 10A, 10B, and 10C are used, although details will be described later.

When server 30 performs machine learning (for example, a deep learning process), processor 31 executes a program stored in a nonvolatile memory to generate a learning model (neural network: NN). Server 30 receives model parameters P, which is the result of learning, from plural cameras 10, and integrates model parameters P in which installation statuses of cameras 10 installed in surveillance area SA (that is, the installation environment such as installation angle and angle of view) are the same.

Learning database (DB) 34 stores model parameter P (for example, a weighting coefficient and a threshold value) that is a result of learning transmitted from plural cameras 10 and received by server 30.

Table memory 35 stores a table in which information on processing capabilities of a plurality of cameras 10 (for example, the amount of free resources) is registered.

Operator 36 has various buttons, such as learning button bt 5 that can be operated by the user (see FIG. 13, for example), and receives an input operation by the user.

Display 37 displays a user interface (UI) screen 310 (see FIG. 12 or FIG. 13, for example) that presents the processing result of the integrated learning in server 30.

Figure 5:
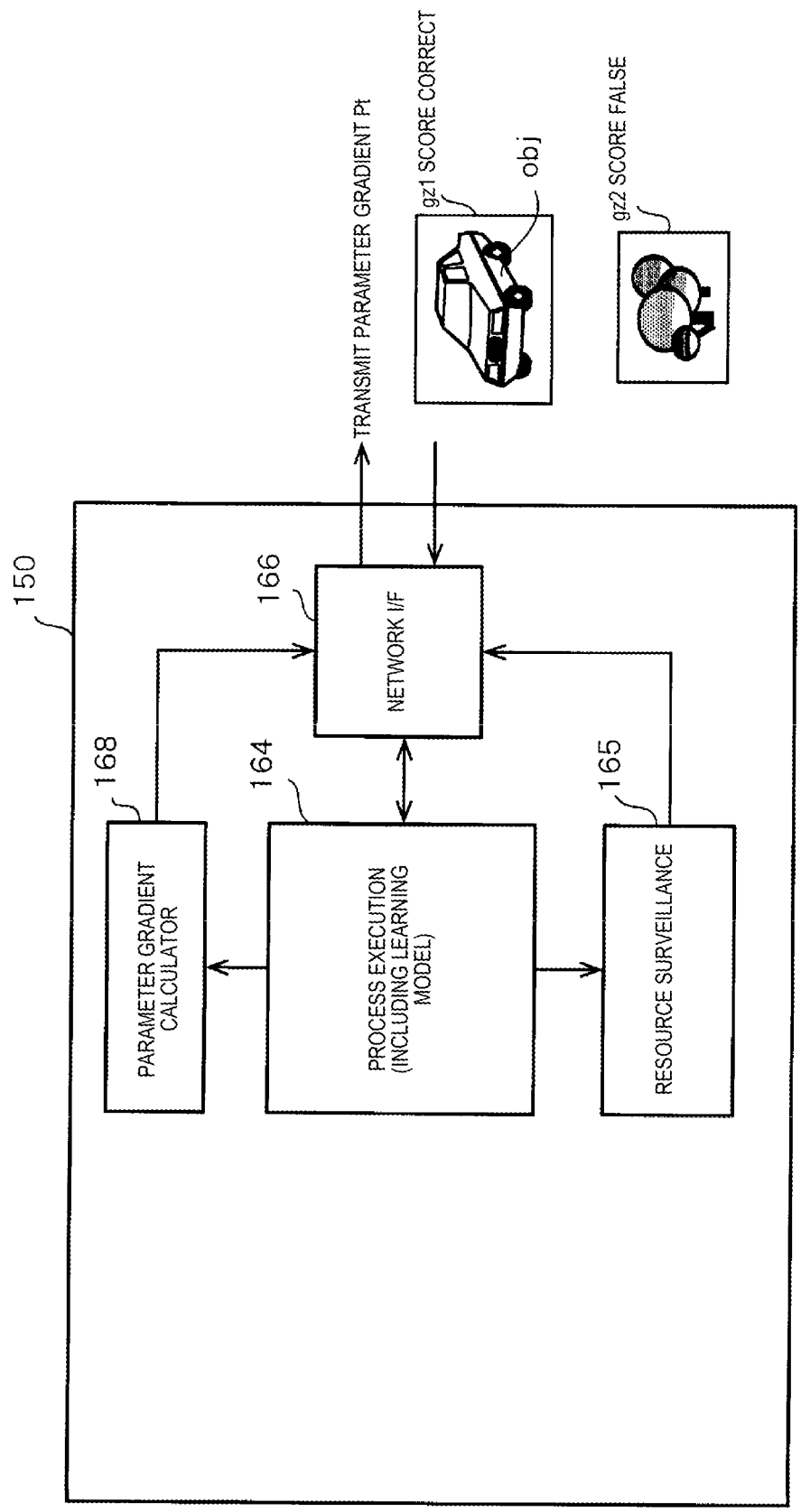
FIG. 5 is an explanatory diagram of an outline example of learning in a device.

FIG. 5 is an explanatory diagram of an outline example of learning in device 150.

Here, a case where device 150 learns the "car" appearing in the captured image as object obj will be described as an example. As described above, learning is normally performed offline (asynchronous), and may be performed by any of camera 10, server 30, and recorder 50. In the present exemplary embodiment, as an example of device 150, camera 10 performs learning. Device 150 is configured to include a process execution 164, resource surveillance 165, network I/F 166, and parameter gradient calculator 168.

The network I/F 166 controls connection with network NW and receives learning data through network NW. Here, the learning data is captured image data gz1, gz2 with the car as object obj. Each of captured image data gz1, gz2 is teacher data to which a score (evaluation value) and a regular report or a false report is added. For example, captured image data gz1 is a captured image including a "car" as an object, and is teacher data having a high score or regular report. On the other hand, captured image data gz2 is an image of "tree" which is not a car as an object, and is teacher data having a low score or false report.

Process execution 164 updates model parameters P (for example, weighting coefficients, threshold values, or the like) of the learning model by executing inference based on these teacher data input through network I/F 166. Further, process execution 164 transmits updated model parameter P to another device such as camera 10, server 30, and recorder 50, through network I/F 166. In this manner, by performing "supervised learning", the learning ability is enhanced, and process execution 164 can generate a high-quality learning model.

Parameter gradient calculator 168 calculates the gradient of the object appearing in the captured image of the teacher data. For example, the captured image captured by the camera from the side and the captured image captured by the camera from the front are different even if the object is the same. That is, model parameter P of the learning model used when the same object is detected varies depending on the installation status of the camera (for example, installation angle and angle of view). Therefore, parameter gradient calculator 168 calculates a gradient (hereinafter referred to as "parameter gradient") representing the image capturing direction and transmits parameter gradient Pt to camera 10, server 30, recorder 50, or the like, which is another device, through network I/F 166. Parameter gradient Pt may be transmitted together with the model parameters or separately. In any case, since the installation status of the camera is not frequently changed, parameter gradient Pt may be transmitted at least once. By using parameter gradient Pt, different learning models can be used for each installation status of the camera.

Resource surveillance 165 monitors the amount of free resources, based on the usage status of the GPU, the memory, and the like in process execution 164. In a case where device 150 is camera 10, process execution 164 and parameter gradient calculator 168 shown in FIG. 5 correspond to process execution 14 in FIG. 3, resource surveillance 165 shown in FIG. 5 corresponds to resource surveillance 15 shown in FIG. 3, and network I/F 166 shown in FIG. 5 corresponds to network I/F 16 shown in FIG. 3.

Figure 6:
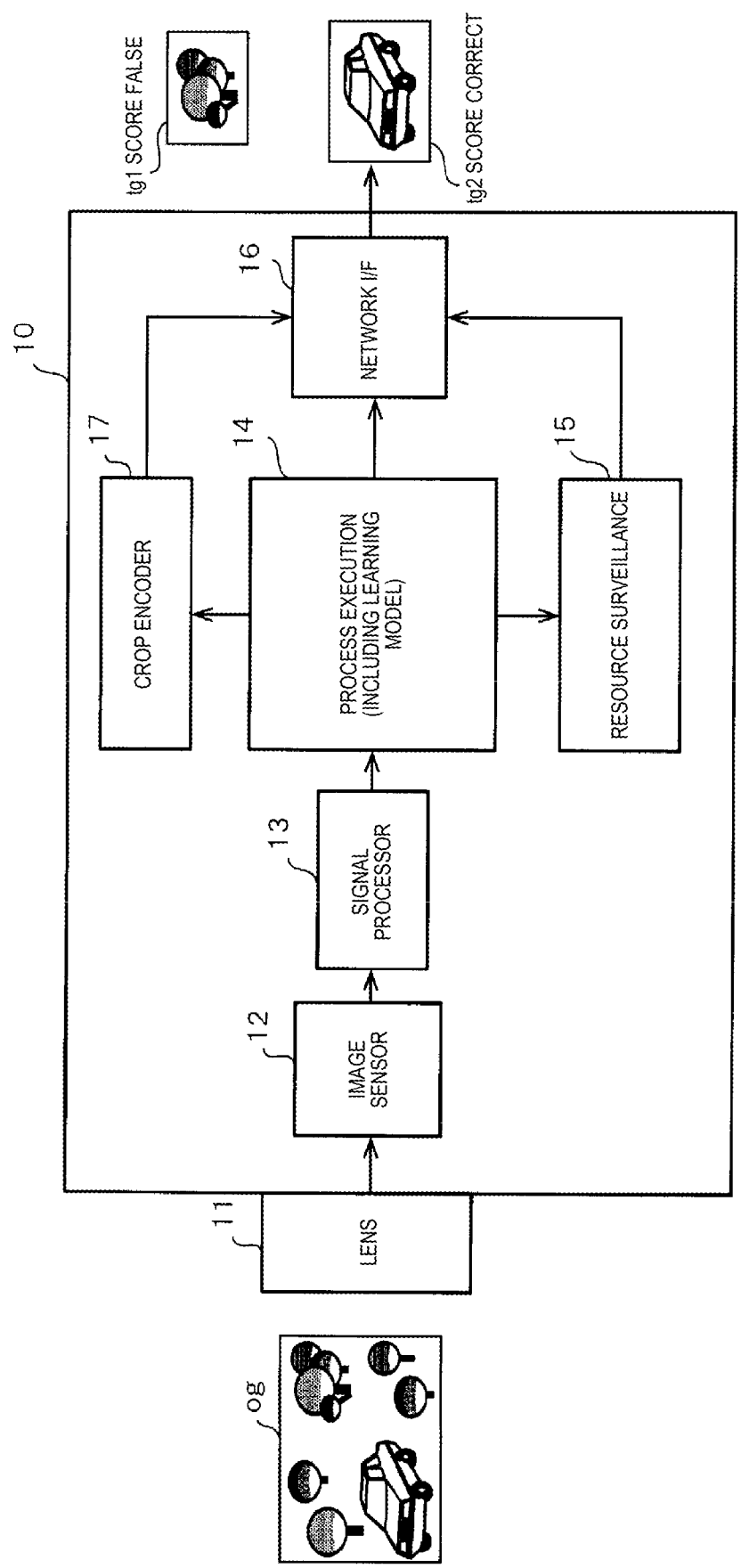
FIG. 6 is an explanatory diagram of an outline example of detection by the camera.

FIG. 6 is an explanatory diagram of an outline example of detection by camera 10.

Here, a case where camera 10 detects the "car" appearing in the captured image as an object will be described as an example. Process execution 14 of camera 10 has a learning model (that is, a learned model) after machine learning (for example, a deep learning process) is performed. Process execution 14 receives captured image og of the subject captured through lens 11, performs detection (that is, inference of an object appearing in captured image og) using the learned model, and outputs the detection result (that is, Inference result). Crop encoder 17 cuts out an image to be an object included in captured image og of the subject and outputs a cutout image as a result of detection.

Here, cutout image tg2 of "car" and cutout image tg1 of "tree" which are cut out by crop encoder 17 are output. Cutout image tg2 of the "car" includes a captured image of a car as an object, so it has a high score and a regular report. On the other hand, since cutout image tg1 of "tree" does not include the captured image of the car as the object, it has a low score and a false report.

Next, a specific operation of surveillance system 5 of the present exemplary embodiment will be described with reference to the drawings.

Figure 7:
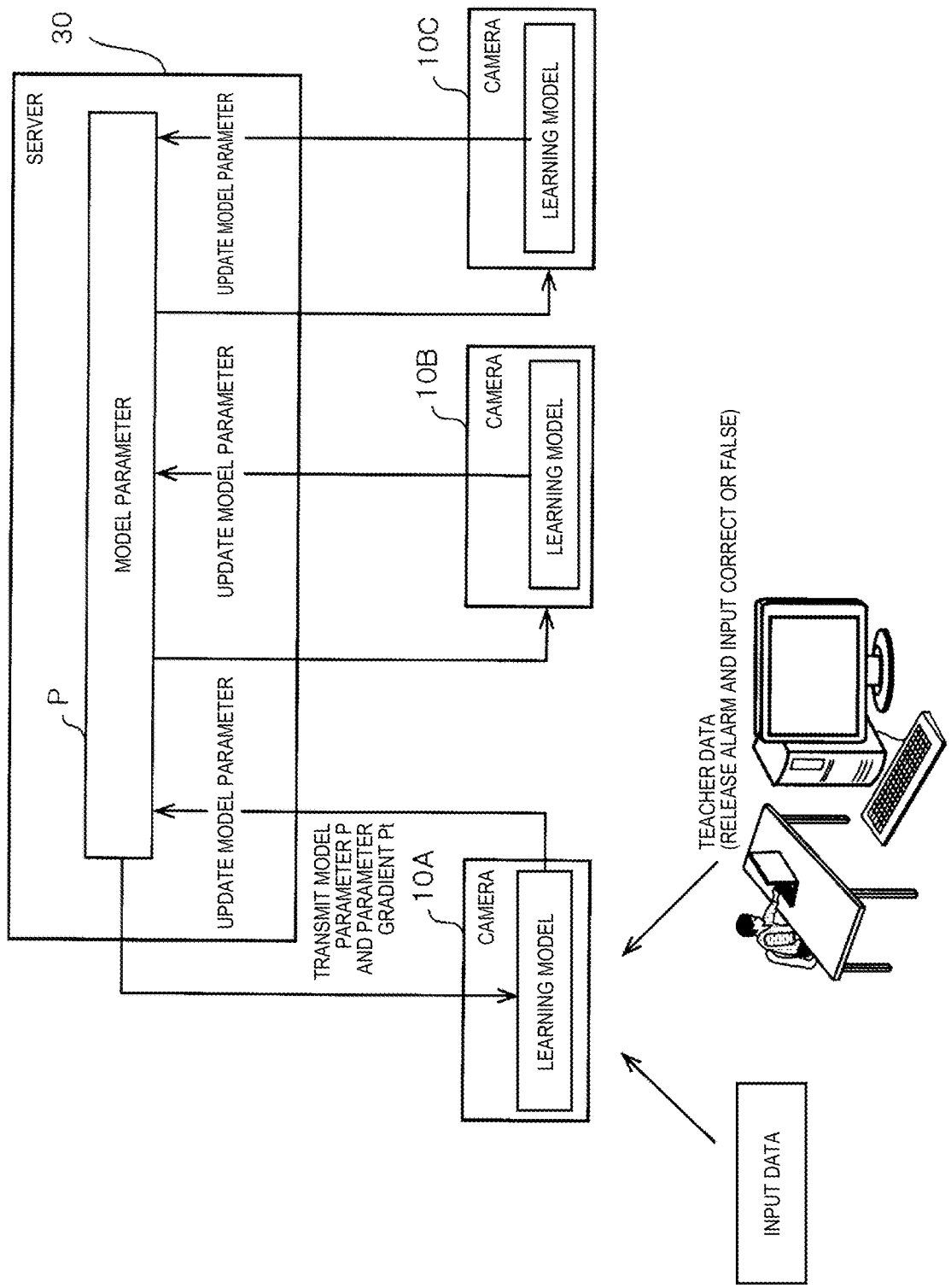
FIG. 7 is an explanatory diagram of a process outline example when performing distribution at the time of learning using a plurality of cameras in the surveillance system.

FIG. 7 is an explanatory diagram of a process outline example when performing distribution at the time of learning using a plurality of cameras in surveillance system 5.

As described above, in learning, a process of updating model parameter P of a learning model (that is, a neural network) generated using a deep learning process as an example of machine learning of artificial intelligence (AI) technology is performed. As an example, a case in which three cameras 10A, 10B, 10C as devices performing learning perform learning is shown. The device that performs learning is not limited to a camera, and may be a server or a recorder. Each of cameras 10A, 10B, 10C performs, for example, "unsupervised learning" on the captured image data which is input respectively. In the unsupervised learning, camera 10 generates an alarm when the model parameters of the learning model do not converge. At this time, the user releases the alarm and performs "supervised learning". In supervised learning, the user inputs a regular report or a false report of image data. In the input of the teacher data, a score (evaluation value) may be input together with a regular report or a false report, instead of inputting a regular report or a false report of the image data. The score is a value for evaluating that the captured image data is captured image data including an object, and is expressed by points such as 80 points, 10 points, or the probability of 50%, 20%, or the like.

Each of three cameras 10A, 10B, 10C transmits model parameter P, which is the result of learning, to server 30. Parameter gradient Pt described above is added to model parameter P to be transmitted.

Server 30 updates model parameter P of the learning model, based on model parameter P transmitted from three cameras 10A, 10B, 10C. At this time, model parameters having same parameter gradient Pt, that is, model parameters having the same installation status of cameras are integrated. Accordingly, the model parameters of the learning model having the same parameter gradient are updated. Here, the installation statuses of cameras 10A, 10B, 10C are the same, and server 30 integrates the updated respective model parameters of cameras 10A, 10B, 10C.

Server 30 feedbacks the integrated model parameter to three cameras 10A, 10B, and 10C. Thus, the model parameters stored in three cameras 10A, 10B, and 10C are the same. The transmission of model parameters from three cameras 10A, 10B, 10C to server 30 is performed asynchronously.

Figure 8:
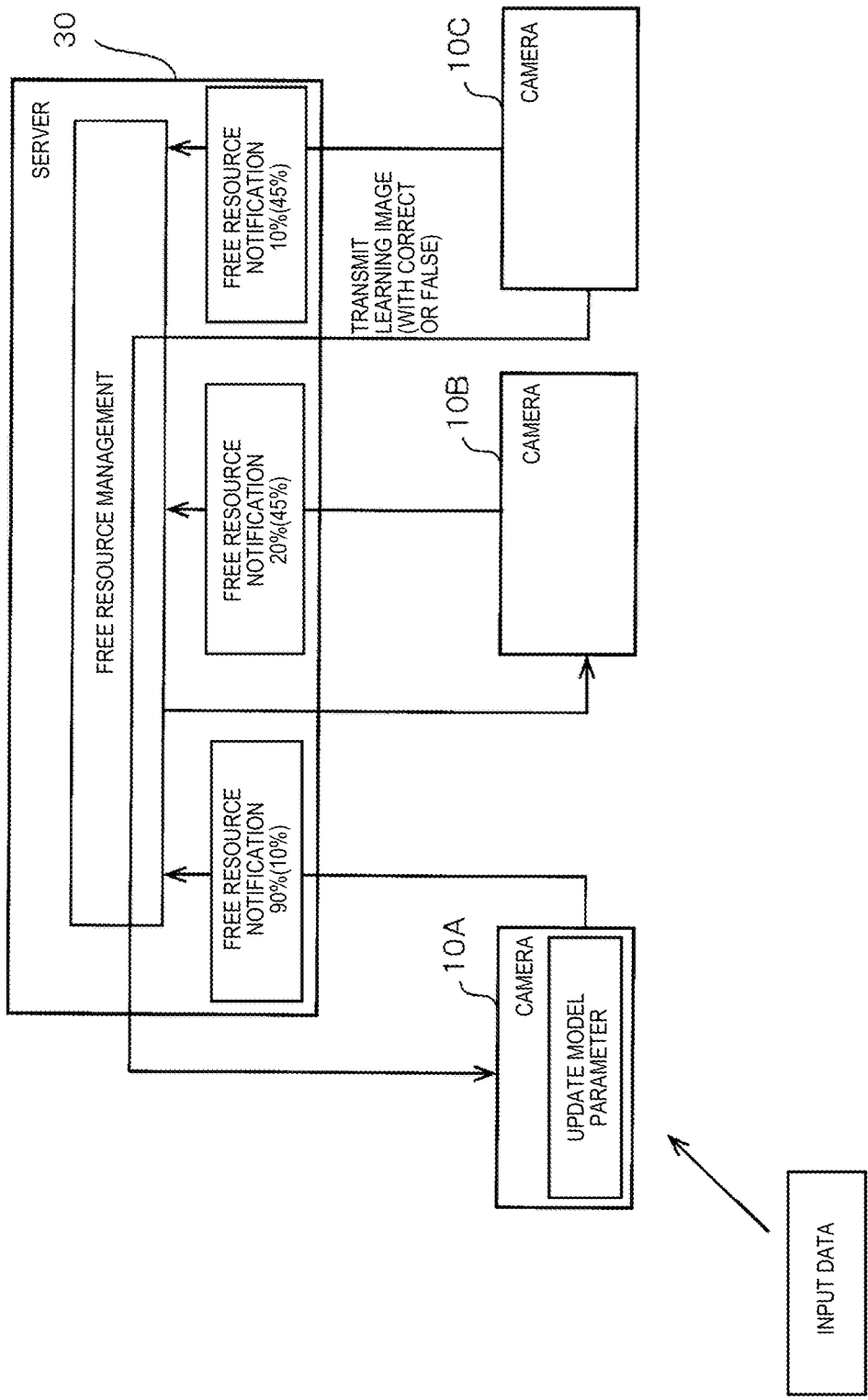
FIG. 8 is an explanatory diagram of an outline example of resource management in the surveillance system.

FIG. 8 is an explanatory diagram of an outline example of resource management in surveillance system 5.

In each of three cameras 10A, 10B, and 10C, resource surveillance 15 monitors the amount of free resources (in other words, the remaining capability indicating the degree of excess of processing capability) with respect to the processing capability of the GPU or FPGA that generates the learning model. Three cameras 10A, 10B, 10C asynchronously or periodically notifies server 30 of the amount of free resources monitored by resource surveillance 15. The amount of free resources is expressed as a percentage (%) of the processing capability. As an example, in a case where the amount of free resources of camera 10A is 90%, the amount of free resources of camera 10B is 20%, and the amount of free resources of camera 10C is 10%, server 30 outputs a learning instruction to camera 10A so as to cause camera 10A having a large amount of free resources to preferentially learn, that is, to increase the learning amount.

In a case where the bandwidth of network NW is wide or network NW is free, if server 30 receives the captured image data (with information on a regular report or a false report) captured by camera 10C having a small amount of free resources (10%), server 30 may transmit the captured image data to camera 10A having the amount of free resources as much as 90% and instruct learning. Thus, proper learning can be realized without imposing unbalanced processing loads to the cameras.

Server 30 may instruct a camera with a small amount of free resources to directly transfer captured image data captured by the camera to a camera with a large amount of free resources to perform learning. Thus, learning can be distributed in the surveillance system, and efficient learning is possible without imposing a heavy load on a specific camera.

Server 30 may instruct a camera with a small amount of free resources to directly transfer captured image data captured by the camera to a camera with a large amount of free resources to perform detection. Thus, detection can be distributed in the surveillance system, and efficient detection is possible without imposing a heavy load on a specific camera.

Server 30 may instruct a camera with a small amount of free resources to directly transfer captured image data captured by the camera to a camera with a large amount of free resources to perform analysis. Here, the analysis is a process such as tracking an object obj appearing in the captured image or recognizing whether or not the object corresponds to a suspicious person, and the contents of analysis are not particularly limited in the present exemplary embodiment. Thus, analysis can be distributed in the surveillance system, and efficient analysis is possible without imposing a heavy load on a specific camera.

Server 30 monitors the overall processing capability of surveillance system 5, and may instruct each camera 10 to increase the learning amount in a case where the amount of free resources of the entire system is large and instruct each camera 10 to reduce the learning amount in a case where the amount of free resources of the entire system is small. This enables proper learning without imposing a heavy load on the entire surveillance system.

Server 30 may instruct all the cameras 10 to share the detection result by each camera 10. Thus, the results of detection can be distributed to each camera 10 and used for subsequent detection, thereby detection accuracy can be improved.

In a case where the amount of free resources of camera 10 is large, server 30 may give an instruction to increase the feedback amount (for example, the number of times of feedbacks) of the result of the integrated learning to be transmitted to camera 10. On the other hand, in a case where the amount of free resources of camera 10 is small, server 30 may give an instruction to reduce the feedback amount (for example, the number of times of feedbacks) of the result of the integrated learning to be transmitted to camera 10. Thus, it is possible to feed back (return) the result of learning of an appropriate amount to the camera without imposing a heavy load on the camera.

In addition, three cameras 10A, 10B, and 10C respectively notify server 30 of information on unit cost (for example, information on power cost). The power cost is a value unique to the camera, and is expressed in, for example, units of watt/frame (W/frame). As an example, $\frac{1}{200}$ for camera 10A, $\frac{1}{200}$ for camera 10B, and $\frac{1}{400}$ for camera 10C are exemplified. Note that since the power cost does not change significantly depending on the usual usage condition of the camera, one notification is sufficient. The unit of power cost may be expressed in frame/w (frame/W).

In a case where the power costs of camera 10A and camera 10B are similarly high, server 30 preferentially assigns learning to camera 10C with low power cost.

In a case where the amounts of free resources of the cameras 10A, 10B, 10C are the same or about the same, for example, the amount of free resources of camera 10A is 10% and the amount of free resources of cameras 10B and 10C is all 45%, server 30 outputs a learning instruction to camera 10C so as to cause camera 10C not requiring the power cost to preferentially perform learning.

Incidentally, regardless of the amount of free resources of the camera, server 30 may instruct a camera with low power cost to execute learning, with priority on the cost. The free resources and the power cost of each device are managed by server 30, but it may be managed by each camera or recorder. In that case, the free resources and power cost can be shared with all devices 150 in surveillance system 5. Therefore, in consideration of the free resources and power cost, each device can give an instruction to execute a process, and various operations become possible.

Figure 9:
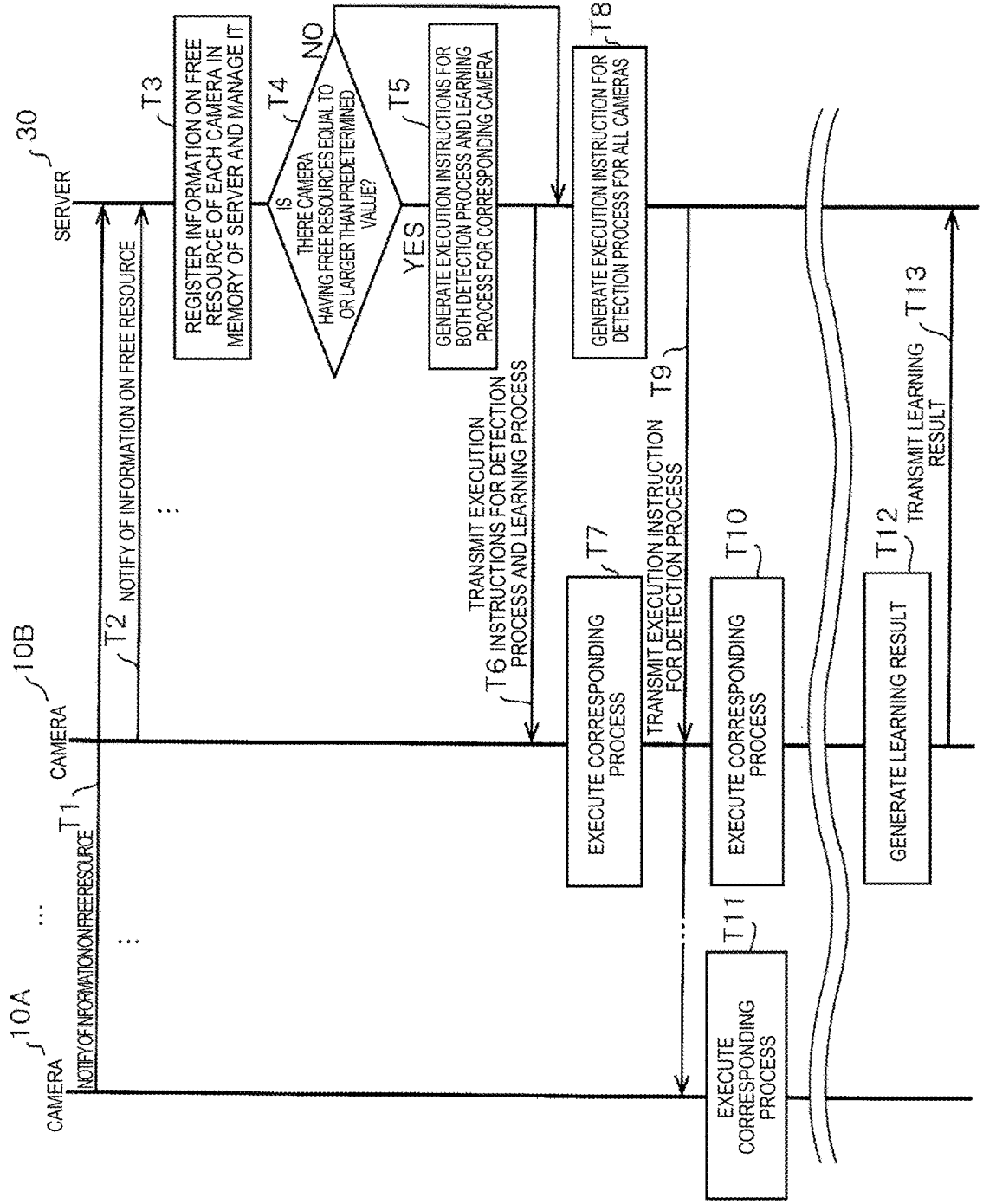
FIG. 9 is a sequence diagram showing in detail an example of an operation procedure in which the server instructs the camera to execute a process in Exemplary Embodiment 1.

FIG. 9 is a sequence diagram showing in detail an example of an operation procedure in which server 30 instructs camera 10 to execute a process in Exemplary Embodiment 1.

In the operation procedure of FIG. 9, server 30 determines camera 10 to be subjected to a distribution process from among plural cameras 10 based on the information on the free resources of camera 10, and instructs corresponding camera 10 to execute the process. The number of cameras N may be any number, and here, for simplicity of explanation, two cameras 10A, 10B are illustrated. Instead of server 30, recorder 50 may determine camera 10 and instruct camera 10 to execute a process.

Camera 10A repeatedly (for example, regularly or periodically) notifies server 30 of the information on the free resource monitored by resource surveillance 15 (T1). Similarly, camera 10B repeatedly (for example, regularly or periodically) notifies server 30 of the information on the free resource monitored by resource surveillance 15 (T2).

Server 30 registers and manages the information on the free resources of cameras 10A, 10B in table memory 35 (T3). Server 30 determines whether there is at least one camera having free resources equal to or larger than a predetermined value (for example, 70%) (T4). Here, it is assumed that only camera 10B has free resources equal to or larger than a predetermined value.

In a case where there is a camera having free resources equal to or larger than a predetermined value (YES in T4), server 30 generates instructions for both detection and learning for the corresponding camera (T5). Server 30 transmits instructions to execute both the detection and the learning to camera 10B through network NW (T6). Camera 10B executes the corresponding process (T7).

On the other hand, in a case when there is no camera having free resources equal to or larger than the predetermined value in the procedure T4 (NO in T4), server 30 generates an instruction to execute detection for all the cameras (here, cameras 10A, 10B) (T8). Since cameras 10A, 10B do not have enough free resources to execute learning, they execute only the detection. Server 30 transmits an instruction to execute detection to all the cameras (in this case, cameras 10A, 10B) (T9). Cameras 10A, 10B respectively execute the corresponding process (T10, T11).

In a case where camera 10B executes the corresponding process in the procedure T7, camera 10B generates a learning result (T12) and transmits the generated learning result to server 30 (T13).

Figure 10:
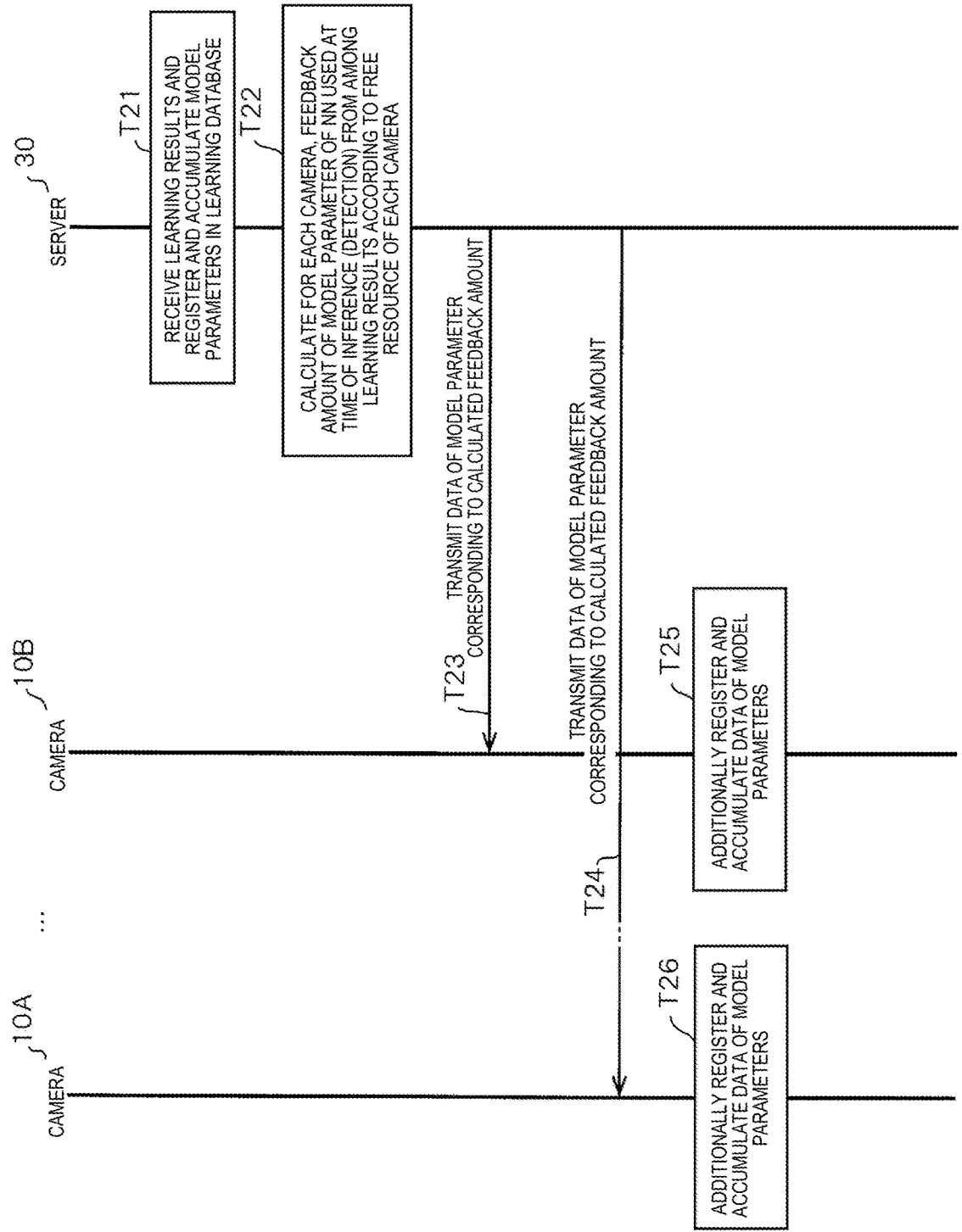
FIG. 10 is a sequence diagram showing in detail an example of an operation procedure for the server to control the feedback amount of a model parameter in Exemplary Embodiment 1.

FIG. 10 is a sequence diagram showing in detail an example of an operation procedure for server 30 to control the feedback amount of the model parameter in Exemplary Embodiment 1.

In the operation procedure of FIG. 10, server 30 controls the feedback amount of the model parameter based on the information on the free resources of camera 10. The number of cameras N may be any number, and here, for simplicity of explanation, it is two (cameras 10A, 10B). Instead of server 30, recorder 50 may determine camera 10 to feed back the model parameters.

Server 30 receives model parameters as learning results from the cameras 10A and 10B, respectively, and stores the model parameters in learning DB 34 (T21). Server 30 calculates for each camera, the feedback amount of the model parameter of the learning model used at the time of inference (detection) process from among many model parameters as learning results according to the amount of free resources of each of cameras 10A, 10B (T22).

Server 30 transmits the data of the model parameter corresponding to the calculated feedback amount to camera 10B (T23). Similarly, server 30 transmits the data of the model parameter corresponding to the calculated feedback amount to camera 10A (T24). Camera 10B additionally registers and stores the model parameters received from server 30 in the memory of process execution 14 (T25). Similarly, camera 10A additionally registers and stores the model parameters received from server 30 in the memory of process execution 14 (T26).

Although the feedback amount is determined by server 30 based on the information on the free resource of each camera here, it is not limited to the free resource, and the feedback amount may be determined according to the number of detected regular reports based on the teacher data and the number of detected false reports based on the teacher data.

Figure 11:
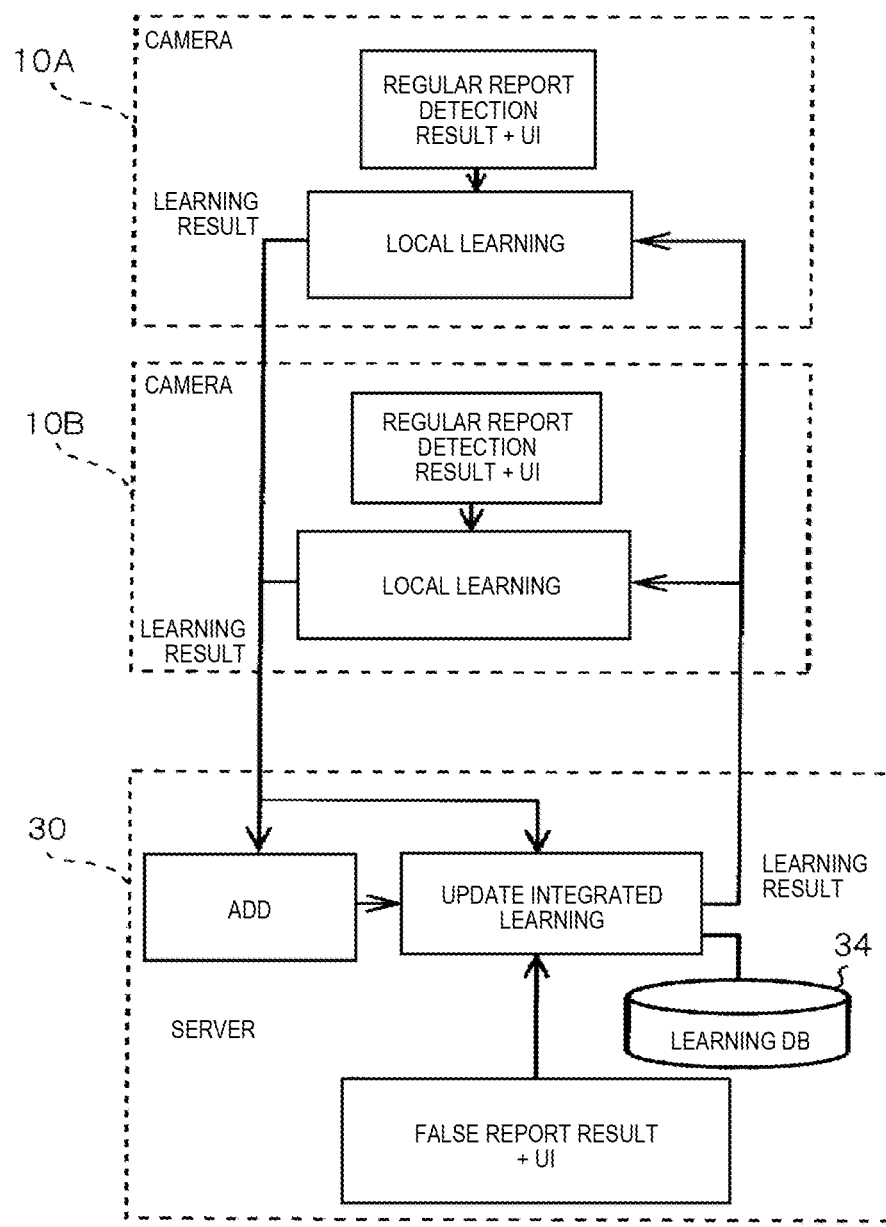
FIG. 11 is an explanatory diagram of an outline example of sharing of learning results in the surveillance system.

FIG. 11 is an explanatory diagram of an outline example of sharing of learning results in surveillance system 5.

Each of cameras 10 (10A, 10B, 10C) performs local learning using captured image data obtained by capturing and updates model parameters. Each camera 10 can perform learning using only captured image data from which a regular report is obtained, and can improve the accuracy of the model parameter that is the result of learning. Camera 10 can display UI screen 320 (see FIG. 12) for evaluating captured image data in the local learning, on display 19 connected as an option. Further, camera 10 can display UI screen 320 at the time of local learning on display 37 of server 30.

Figure 12:
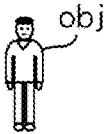
FIG. 12 is a diagram showing an example of a UI screen displayed at the time of local learning.

FIG. 12 is a diagram showing UI screen 320 displayed at the time of local learning.

UI screen 320 is displayed on display 37 of server 30 or a display of a PC (not shown) which is connected to camera 10 so as to be communicable, for example, at the time of local learning of camera 10, and specifically correctness determination, a camera ID, and reject button bx are displayed for each learning data cutout from the captured image data. The thumbnail of the captured image data may not be displayed here but may be displayed since camera 10 stores the original captured image data. The detection object obj is "person".

In the correctness determination process, server 30 makes a determination as a regular report in a case where object obj can be detected in the captured image data and makes a determination as a false report in a case where object obj cannot be detected in the captured image data. Server 30 may make a determination as a regular report or a false report by the user inputting data on UI screen 320 displayed on display 37 of server 30.

The camera ID is the identification information of the camera which captures an image for obtaining the learning data.

Reject button bx is selected by the user and a check mark is displayed. The learning data, to which the check mark in reject button bx is added, is not used for learning in a case where the user presses learning button bt5.

Although camera 10 automatically does not use the captured image data of a false report for adopted learning and uses the captured image data of a regular report for adopted learning, instead of camera 10, the user may give an instruction about the captured image data by using reject button bx. For example, the user may be given an instruction not to use the captured image data of a false report for adopted learning but to use the captured image data of a regular report for adopted learning. Thus, it is possible to perform learning using the captured image data of a false report. Camera 10 may combine the captured image data of a regular report and the captured image data of a false report and use it for learning. Thus, captured image data used for learning can be selected according to the quality of the captured image data.

Server 30 receives model parameter P transmitted from each of cameras 10 (10A, 10B, 10C), performs integrated learning for aggregating respective received model parameters P, and adds the aggregated model parameters P to learning DB 34. Here, the model parameters to be integrated are model parameters obtained based on the image data captured by the cameras having the same installation condition. On the other hand, model parameters obtained based on the image data captured by cameras with different installation statuses are not aggregated, but are individually registered as model parameters for different learning models.

Figure 13:
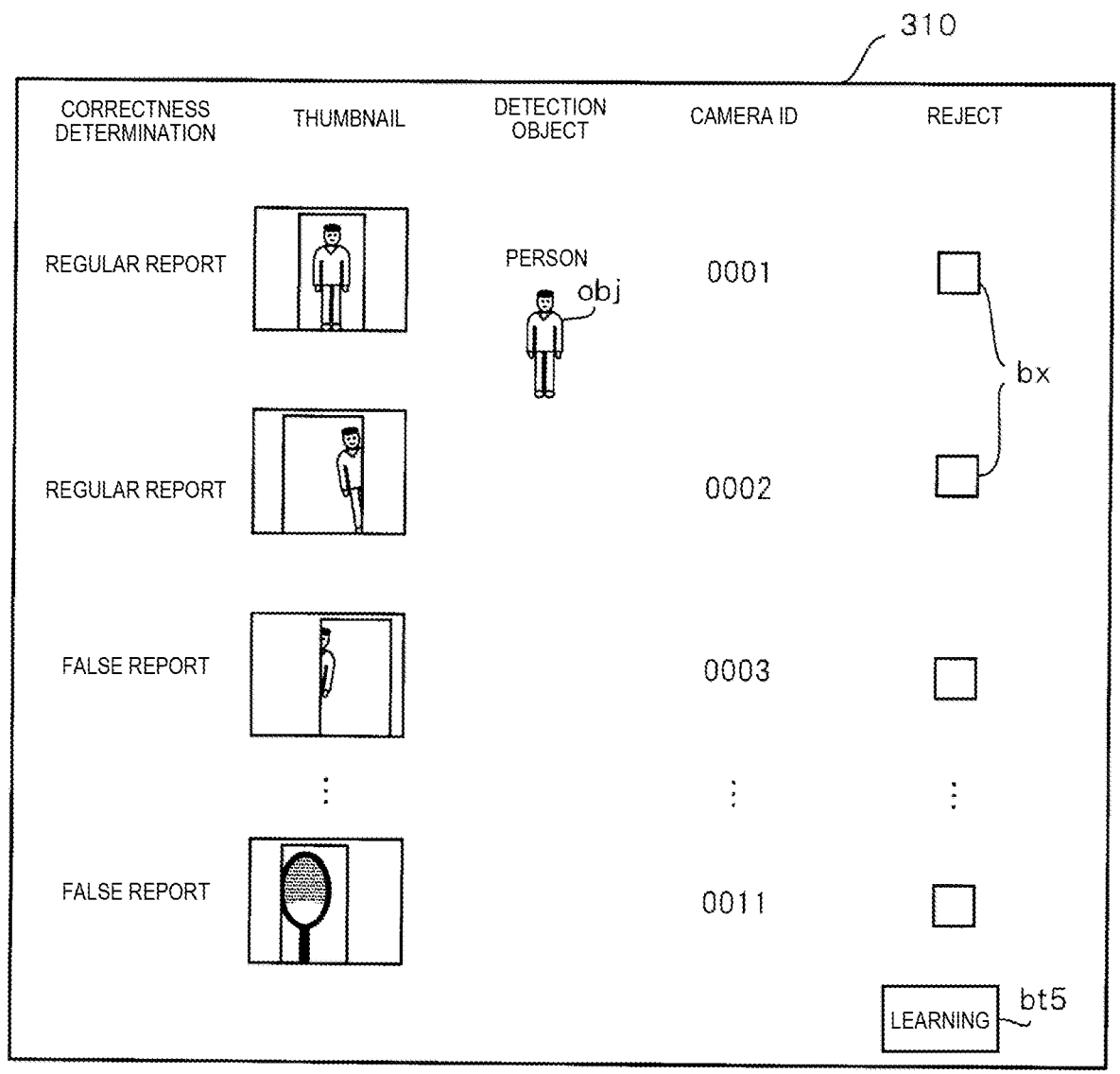
FIG. 13 is a diagram showing an example of a UI screen displayed on the display of the server at the time of integrated learning.

FIG. 13 is a diagram showing UI screen 310 displayed on display 37 of server 30 at the time of integrated learning.

Server 30 can display UI screen 310 (see FIG. 13) at the integrated learning on display 37. On UI screen 310, correctness determination, a thumbnail, a camera ID, and reject button bx are displayed for each learning data cut out from the captured image data. Here, the case where the detection object is "person" is shown.

In the correctness determination process, server 30 makes a determination as a regular report in a case where object obj can be detected in the captured image data and makes a determination as a false report in a case where object obj cannot be detected in the captured image data. Server 30 may make a determination as a regular report or a false report by the user inputting data on UI screen 310 displayed on display 37 of server 30.

The thumbnail is a reduced image of the learning data. Since it is a thumbnail, when transmitting the thumbnail from camera 10 to server 30, the data transfer amount is suppressed. The camera ID is the identification information of the camera which captures an image for obtaining the learning data.

Reject button bx is selected by the user and a check mark is displayed. The learning data, to which the check mark in reject button bx is added, is not used for learning in a case where the user presses learning button bt5.

Server 30 performs learning to automatically adopt the captured image data of a regular report (that is, performs learning to accumulate model parameters used for detecting the captured image data of a regular report), and performs learning to exclude the captured image data of a false report (that is, performs learning not to accumulate model parameters used for detecting the captured image data of a false report). However, regarding selection of the captured image data to be used for learning, the user may voluntarily use reject button bx to instruct the captured image data to be used for learning. The user may give an instruction not to perform learning excluding the captured image data of a false report but to perform learning adopting the captured image data of a regular report.

In this way, server 30 performs integrated learning of model parameters, so the accuracy of learning of model parameters is improved. Server 30 feedbacks the updated model parameter, which is the result of integrated learning, to corresponding camera 10. Accordingly, the more the regular report of the captured image data obtained by each camera 10, the higher the detection accuracy of the camera.

In addition, server 30 controls the feedback amount according to the number of regular reports of each camera 10 when feedbacking the updated model parameter P, which is the result of integrated learning, to each camera 10. That is, server 30 transmits the updated model parameters such that the feedback amount (for example, the number of times of feedback) increases for camera 10 having a large number of false reports. Thus, the number of regular reports increases, and the detection accuracy of the camera improves.

On the other hand, server 30 transmits the updated model parameters such that the feedback amount (for example, the number of times of feedback) decreases for camera 10 having a large number of regular reports. Thus, the processing load of the camera can be reduced. Server 30 transmits the same updated model parameters to the cameras having the same installation environment to share the same, as described above.

Server 30 notifies each camera 10 of the amount of learning according to the number of regular reports of each camera 10, in a case of instructing each camera 10 to perform learning. Server 30 instructs camera 10 having a large number of false reports to perform learning so that the amount of learning increases. Thus, the number of regular reports increases, and the detection accuracy of the camera improves. On the other hand, server 30 instructs camera 10 having a large number of regular reports to perform learning so that the amount of learning is reduced. Thus, the processing load of the camera can be reduced.

Server 30 may integrate and manage the detection results of detecting the objects appearing in the captured images captured by respective cameras 10. In a case of integrating the detection results, the motion of the object may be represented by a vector and the detection result may be managed by a vector.

As described above, in surveillance system 5 according to the Exemplary Embodiment 1, server 30 and plural cameras 10 provided in surveillance area SA are communicably connected to each other. Server 30 includes table memory 35 that retains free resources (that is, information on processing capability) of each camera 10 and data of captured images obtained by respective cameras 10 capturing surveillance area SA. Server 30 determines for each camera 10, a process to be executed by camera 10 with respect to the detection of at least one object obj appearing in the captured image obtained by each camera 10, based on the information on the processing capability of camera 10, and transmits an instruction to execute the determined process to each camera 10. Each of cameras 10 executes a process corresponding to the instruction to execute, based on an instruction to execute the process transmitted from server 30.

Thus, when detecting at least one object in each captured image captured by plural cameras 10 installed in surveillance area SA, surveillance system 5 can distribute a process such as learning of parameters used for the detection to plural cameras 10, suppress an increase in traffic on the network and to support the reduction of the processing load of server 30 connected to plural cameras 10.

The above-described process is learning to learn model parameter P used for detecting at least one object obj appearing in the captured image. Thereby, surveillance system 5 can distribute learning with a large load to plural cameras 10.

Server 30 transmits an instruction to execute learning to each of plural cameras 10. Each of plural cameras 10 executes learning according to an instruction to execute learning. Server 30 receives the result of learning executed by plural cameras 10. Thus, server 30 can obtain the result of learning from plural cameras 10, for example, without learning by server 30.

Server 30 executes the learning, and transmits an instruction to execute learning to each of plural cameras 10. Each of plural cameras 10 executes learning according to an instruction to execute learning. Server 30 receives the result of learning executed by plural cameras 10. Thus, server 30 can add the result of learning executed by itself to the result of learning obtained from plural cameras 10, and can improve the efficiency of learning from the next time.

Further, server 30 transmits the result of learning to the plurality of cameras. Plural cameras 10 share the result of learning. This allows plural cameras to use the same result of learning.

In addition, a part of plural cameras 10 are installed under the same installation status. Server 30 transmits the result of learning to some of plural cameras 10 having the same installation status, respectively. Some of plural cameras 10 having the same installation status share the result of learning transmitted from server 30. Thus, surveillance system 5 can improve the detection accuracy of the object by plural cameras 10 having the same installation status.

Server 30 controls the processing amount of learning according to the number of detected objects obj detected by camera 10. Thus, server 30 can reduce the amount of learning that increases the load on the camera with a large number of detected objects and a high processing load. On the other hand, server 30 can increase the amount of learning for cameras with a large number of detected objects and a small processing load. Therefore, the processing load of the camera is made uniform.

Server 30 controls the processing amount of learning in camera 10 according to the number of regular reports about detection of objects obj detected by camera 10. Thus, server 30 uses a lot of results of learning of the regular report, so that it is possible to improve the accuracy of the result of learning (in other words, the accuracy of the subsequent detection).

Server 30 controls the amount of learning in camera 10 according to the number of false reports about detection of objects obj detected by camera 10. Thus, server 30 does not use the learning result of the false report, so that it is possible to improve the accuracy of the learning result (in other words, the accuracy of the subsequent detection) as a result.

Server 30 controls the processing amount of learning in camera 10 according to the amount of processing capability of camera 10. Thus, server 30 can distribute learning to a plurality of cameras without imposing a heavy load on a specific camera, and it is possible to realize efficient learning.

Server 30 retains in table memory 35 information on the processing capability of each of server 30 and plural cameras 10 constituting surveillance system 5. Server 30 controls the processing amount of learning according to the amount of processing capability of each of server 30 and plural cameras 10. Thus, server 30 can distribute learning to a plurality of devices without imposing a heavy load on a specific device in a surveillance system, and it is possible to realize efficient learning.

The above process includes learning to learn model parameter P used for detecting at least one object obj appearing in captured image og, detection to detect at least one object obj appearing in captured image og, and analysis to analyze at least one object obj detected by detection. Thus, server 30 can distribute the process to plural cameras 10 also in detection and analysis in addition to learning.

Server 30 transmits the data of the captured image stored in table memory 35, and gives an instruction to execute learning, to at least one camera 10 with a relatively high processing capability as compared with other cameras, among plural cameras 10. Thus, server 30 can transmit the captured image data to another camera with high processing capability in the case where the network bandwidth is wide, in a case where the network is free, or the like, and as a result, server 30 can improve the learning speed.

Server 30 transmits the data of the captured image stored in table memory 35 to at least one camera 10, which has a relatively high processing capability as compared with other cameras among plural cameras 10, and gives an instruction to execute detection. Thus, server 30 can transmit the captured image data to another camera with high processing capability in the case where the network bandwidth is wide, in a case where the network is free, or the like, and as a result, server 30 can improve the detection speed.

Server 30 transmits the data of the captured image stored in table memory 35 to at least one camera 10, which has a relatively high processing capability as compared with other cameras among plural cameras 10, and gives an instruction to execute analysis. Thus, server 30 can transmit the captured image data to another camera with high processing capability in the case where the network bandwidth is wide, in a case where the network is free, or the like, and as a result, server 30 can improve the analysis speed.

The above process is detection to detect at least one object obj appearing in captured image og. Server 30 transmits the result of detection to plural cameras 10 respectively. Plural cameras 10 share the result of detection. Thus, server 30 can distribute detection to a plurality of cameras without imposing a heavy load on a specific camera, and it is possible to improve the detection efficiency.

Further, server 30 integrates the results of learning executed by plural cameras 10. Thus, surveillance system 5 can improve the accuracy of the result of learning that is aggregated by integration in server 30.

In addition, a part of plural cameras 10 are installed under the same installation status. Server 30 integrates the results of learning executed by plural cameras 10 having the same installation status of camera 10. Thus, server 30 can improve the detection accuracy of the object by cameras having the same installation status.

Server 30 receives a notification of information on the installation status of each of the cameras, from a part of plural cameras 10 having the same installation status, and integrates results of learning executed by the part of plural cameras 10. This makes it easier for server 30 to integrate the results of learning by the cameras having the same installation status.

Further, server 30 and plural cameras 10 share information on the processing capabilities of plural cameras 10 and information on the unit costs of plural cameras 10 (for example, information on the power cost of each camera 10). Thus, in consideration of the free resources and power cost, each device such as a server and plural cameras can give an instruction to execute a process, and various operations become possible.

Process Leading to Exemplary Embodiment 2

According to the related art as disclosed in Patent Document 1, it is disclosed to use the score of the evaluation function on the object in order to obtain the object motion information which is the correct answer of the object to be tracked in the captured image. However, no special consideration has been given to controlling the amount of learning of parameters required for object detection according to the score indicating the object detection accuracy. Therefore, for example, learning parameters to be used for detection that do not originally require learning causes variations in parameter learning accuracy, which may affect the detection accuracy of the object.

Therefore, in Exemplary Embodiment 2, examples of a surveillance system, a surveillance method, a camera, and a parameter registration method will be described in which the learning amount of parameters used in detection is controlled according to the score indicating the detection accuracy of an object, which is obtained in the detection of at least one object in a captured image captured by a camera installed in the surveillance area and learning accuracy in the camera is improved.

Exemplary Embodiment 2

Since the system configuration of surveillance system 5 of Exemplary Embodiment 2 is the same as the system configuration of surveillance system 5 of the Exemplary Embodiment 1 described above, the same reference numerals are used and the explanation thereof is simplified or omitted, and different contents will be described.

Figure 14:
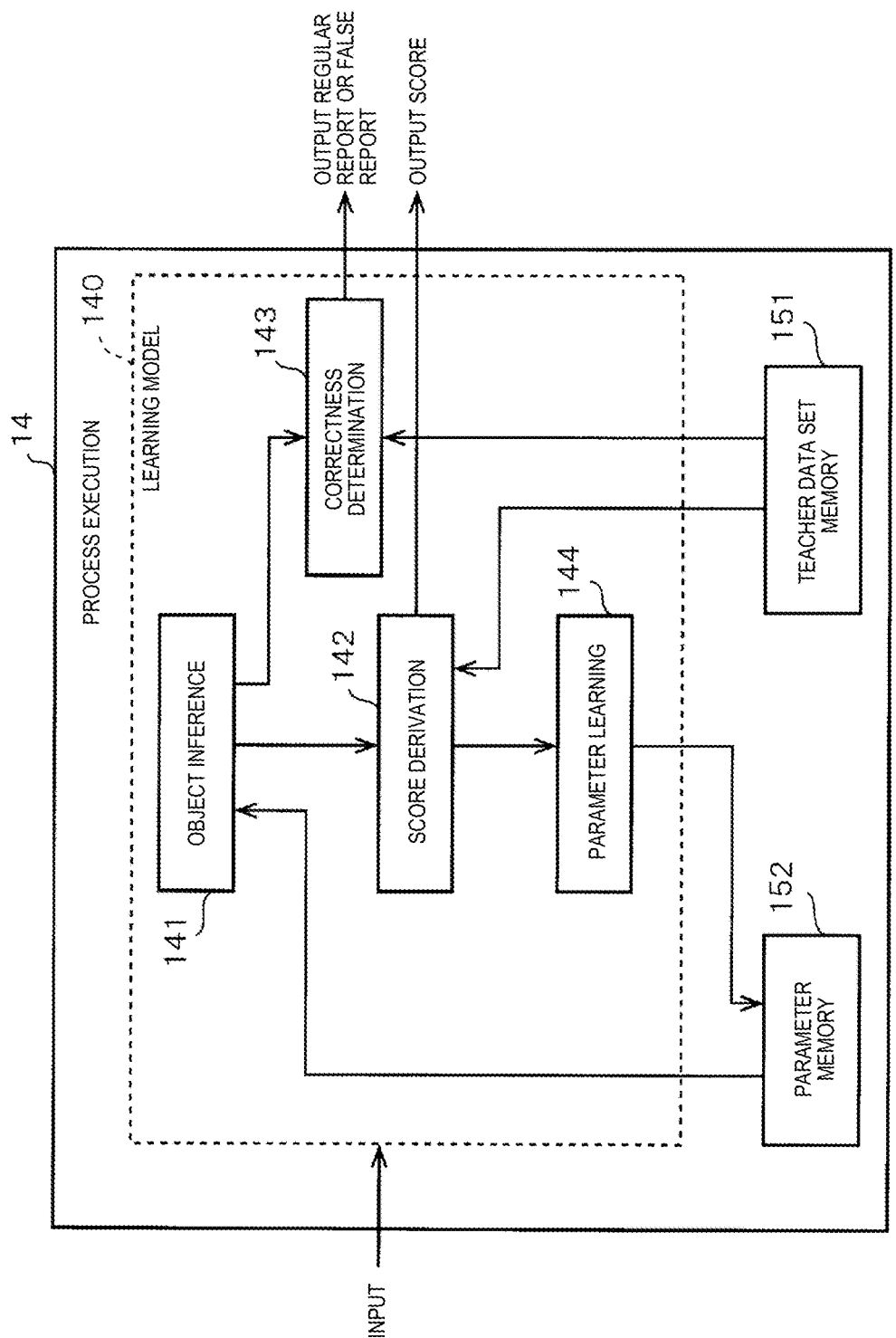
FIG. 14 is a block diagram illustrating in detail an example of the internal configuration of a process execution of a camera of Exemplary Embodiment 2.

FIG. 14 is a block diagram illustrating in detail an example of the internal configuration of process execution 14 of camera 10 of Exemplary Embodiment 2.

Process execution 14, which is the main configuration of camera 10, includes teacher data set memory 151 and parameter memory 152 in addition to neural network (that is, NN 140).

NN 140 has object inference function 141, score derivation function 142, correctness determination function 143, and parameter learning function 144.

In object inference function 141 as an example of the detection unit, NN 140 infers (that is, detects) what the object appearing in the captured image is, according to the model parameter.

In score derivation function 142 as an example of the derivation unit, NN 140 derives a score (evaluation value) indicating the detection accuracy of the object at the time of inference by using the teacher data registered in teacher data set memory 151, and outputs the score.

In correctness determination function 143, NN 140 derives the determination on whether or not the object is correct by using the teacher data registered in teacher data set memory 151 at the time of inference, and outputs the determination result.

In parameter learning function 144 as an example of the parameter learning unit, NN 140 learns to adopt model parameters used for inference of objects with high scores. In parameter learning function 144, NN 140 performs learning to exclude the model parameter used for the inference of the object with low score. NN 140 registers and accumulates the learned model parameters in parameter memory 152. The model parameter used for inferring the object whose score is higher than the first predetermined value (for example, 80 points) registered in parameter memory 152 is transmitted to server 30 in the sharing of a learning result to be described later, and used for integrated learning.

Figure 15:
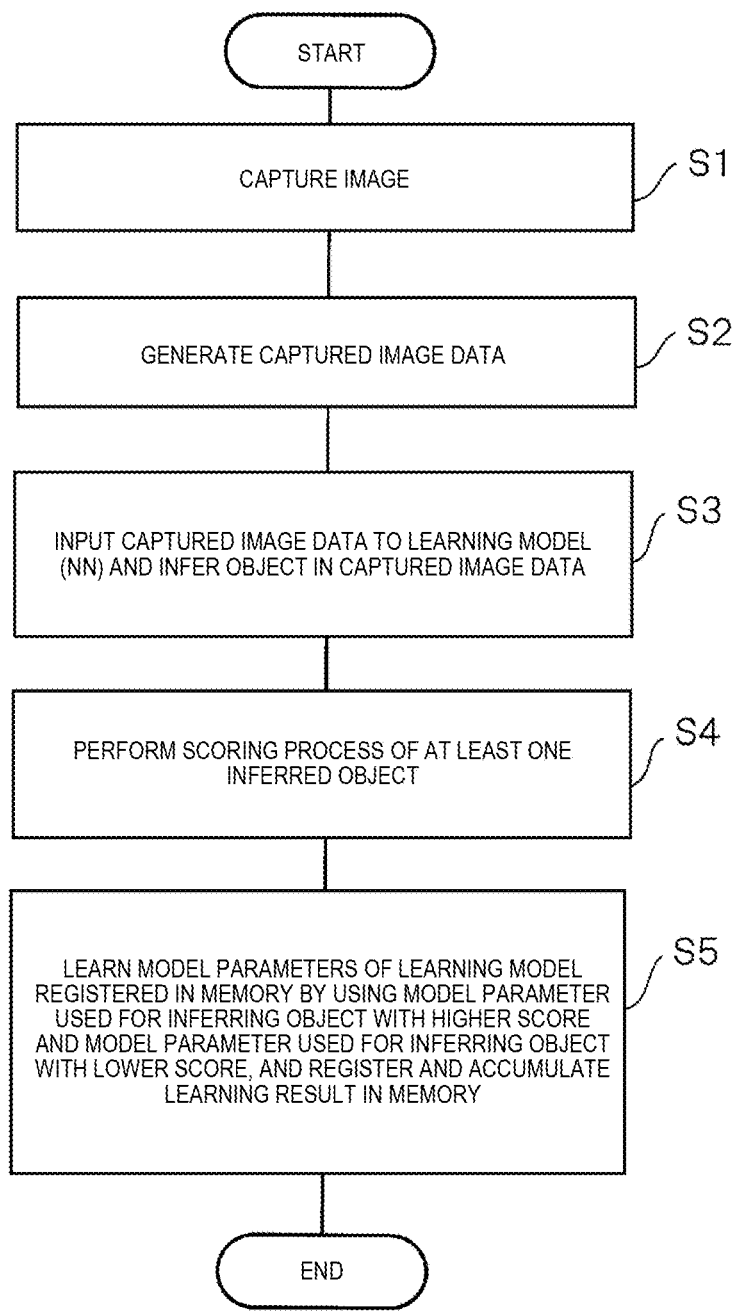
FIG. 15 is a flowchart illustrating in detail an example of an operation procedure of local learning of the camera.

FIG. 15 is a flowchart illustrating in detail an example of an operation procedure of local learning of camera 10.

In FIG. 15, camera 10 captures an image of an object from a subject image in image sensor 12 (S1) and generates captured image data (S2).

Process execution 14 inputs the captured image data and infers (detects) at least one object appearing in the captured image (that is, an object) (S3). Process execution 14 performs a scoring process of at least one object at the time of inference (detection) (S4). In this scoring process, process execution 14 outputs the scores (evaluation values) of the objects by using the teacher data registered in teacher data set memory 151.

As a result of the scoring process, process execution 14 learns the model parameters of NN 140, by using a model parameter used for inferring an object having a higher score than a first predetermined value (for example, 80 points) and a model parameter used for inferring an object having a lower score than a second predetermined value (for example, 10 points) (S5). In step S5, process execution 14 registers the model parameters having a higher score than the first predetermined value in parameter memory 152 and accumulates them.

Thereafter, camera 10 ends the process shown in FIG. 15.

The higher score is, for example, 80 to 100 points. The lower score is, for example, 0 to 10 points. For example, process execution 14 adopts a model parameter with a higher score and excludes a model parameter with a lower score.

The object with a higher score is an object with a high possibility of a regular report, and the object with a lower score is an object with a high possibility of a false report. Therefore, by performing learning so as to adopt the model parameter used for the inference (detection) of the object with a higher score, the model parameters applied to the estimation of the object with a high possibility of a regular report are used, and the learning accuracy of model parameters can be improved.

Therefore, by performing learning so as to exclude the model parameter used for the inference of the object with a lower score, the model parameters applied to the estimation of the object with a high possibility of a false report are not used, and the learning accuracy of model parameters can be improved.

Process execution 14 may perform learning by combining the model parameter used for the inference of the object with a higher score and the model parameter used for the inference of the object with a lower score. In this way, learning accuracy of model parameters can be further improved by performing learning by combining the model parameter used for the inference of the object with a higher score and the model parameter used for the inference of the object with a lower score.

Figure 16:
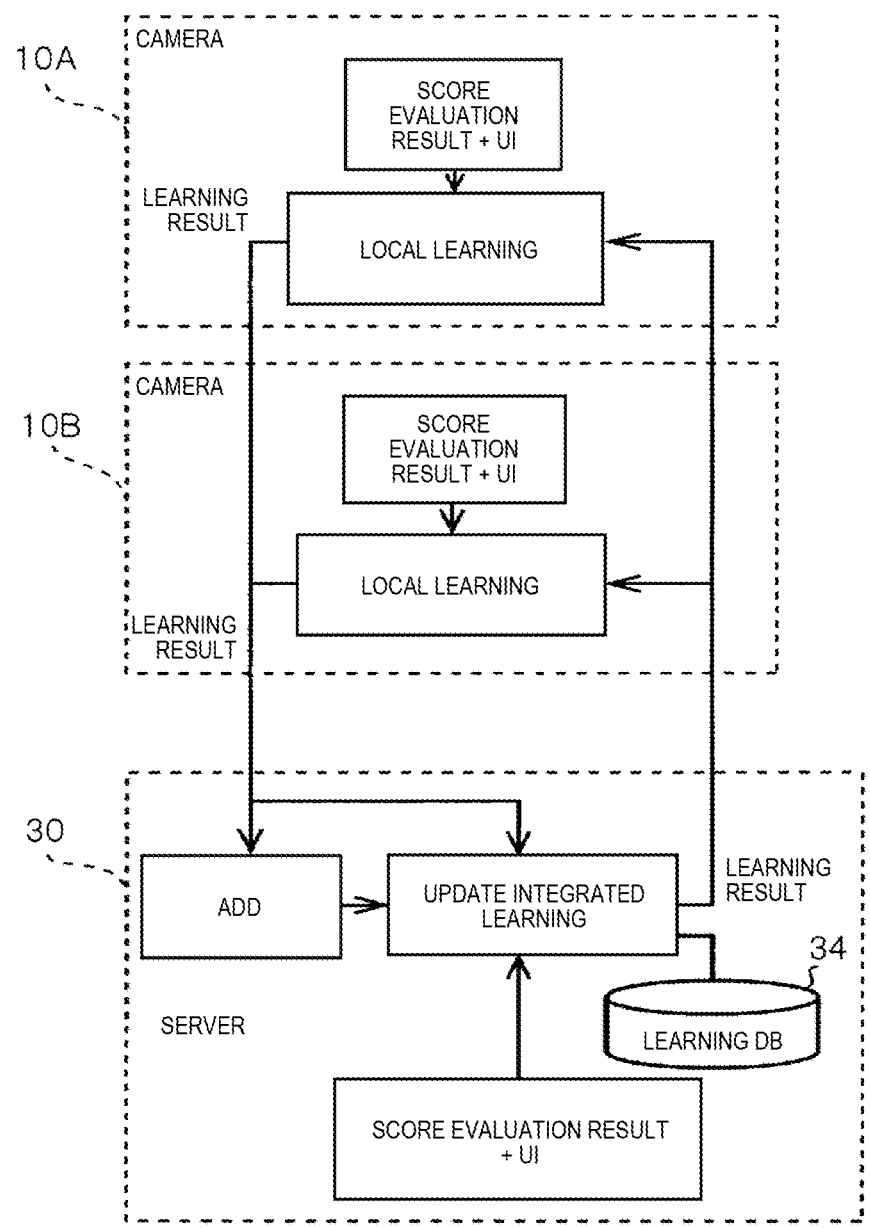
FIG. 16 is an explanatory diagram of an outline example of sharing of learning results in the surveillance system.

FIG. 16 is an explanatory diagram of an outline example of sharing of learning results in surveillance system 5.

Each of cameras 10 (10A, 10B, 10C) performs local learning using captured image data obtained by capturing. In the local learning, each camera 10 executes a scoring process on the detection accuracy of the object detected from the captured image data, and learns the model parameter of NN 140 according to the obtained score. Each camera 10 performs learning by adopting only the model parameter used for inferring (detecting) the object of the higher score. Thus, the learning accuracy of the model parameters can be improved.

In the local learning, UI screen 340 (see FIG. 17) for evaluating captured image data can be displayed. For example, camera 10 may cause a display (not shown) connected as an option to camera 10 to display UI screen 340, or transfer UI screen 340 and cause display 37 of server 30 to display UI screen 340.

Figure 17:
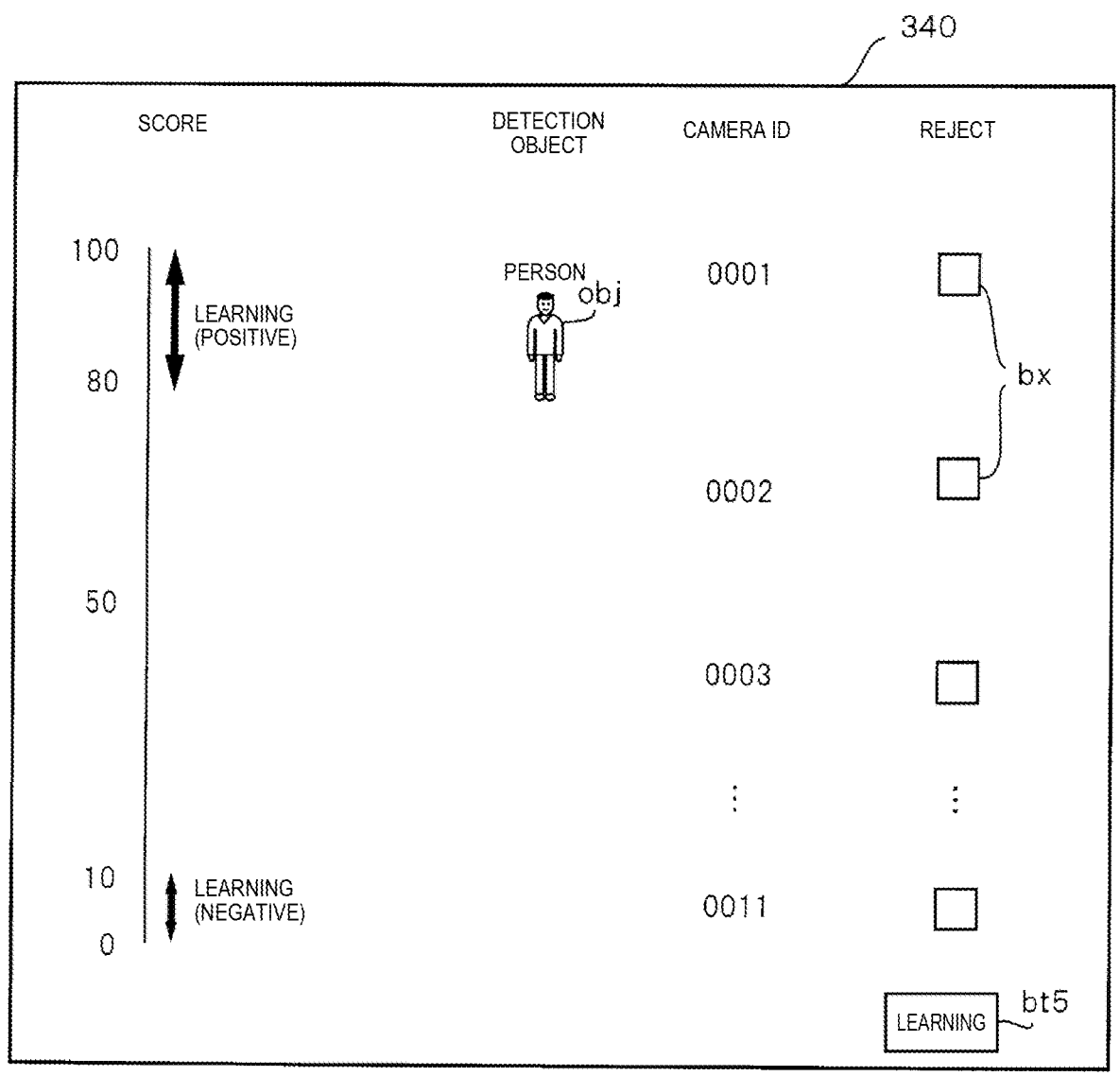
FIG. 17 is a diagram showing an example of a UI screen displayed at the time of local learning.

FIG. 17 is a diagram showing an example of UI screen 340 displayed at the time of local learning.

On UI screen 340, a score, a camera ID, and a reject button bx are displayed for each learning data cut out from the captured image data. The thumbnail of the image data may not be displayed here but may be displayed since camera 10 stores the original captured image data. The detection object is "person".

The score is digitized in the range of 0 to 100 points. The score is calculated by the scoring process by each camera 10, but it may be acquired by the user inputting data on UI screen 320. The camera ID is the identification information of the camera which captures an image for obtaining the learning data. In a case where reject button bx is selected by the user, a check mark is displayed. The learning data, to which the check mark in reject button bx is added, is not used for learning in a case where the user presses learning button bt5.

Camera 10 automatically does not perform learning adopting the captured image data with a lower score but performs learning adopting the captured image data with a higher score. However, for example, instead of camera 10, the user may instruct the captured image data to be used for learning by using reject button bx. For example, the user may instruct not to perform learning excluding the capture image data with a lower score but to perform learning adopting the capture image data with a higher score.

Each camera 10 performs learning adopting only the captured image data with a higher score, but for example, may instruct learning excluding only the captured image data with a lower score. Thus, learning can be performed using the captured image data from which the captured image data with a lower score is excluded. It may be set to use the combination of the captured image data with a higher score and the captured image data with a lower score. Thus, according to the quality of the captured image data, the image data used for learning can be individually selected by the camera or the user.

Server 30 receives model parameter transmitted from each of cameras 10 (10A, 10B, 10C), performs integrated learning for aggregating respective received model parameters, and adds the aggregated model parameters to learning DB 34. Here, the model parameters to be integrated are model parameters obtained based on the image data captured by the cameras having the same installation status. On the other hand, model parameters obtained based on the image data captured by cameras with different installation statuses are not aggregated, but are individually registered as model parameters for different learning models.

Figure 18:
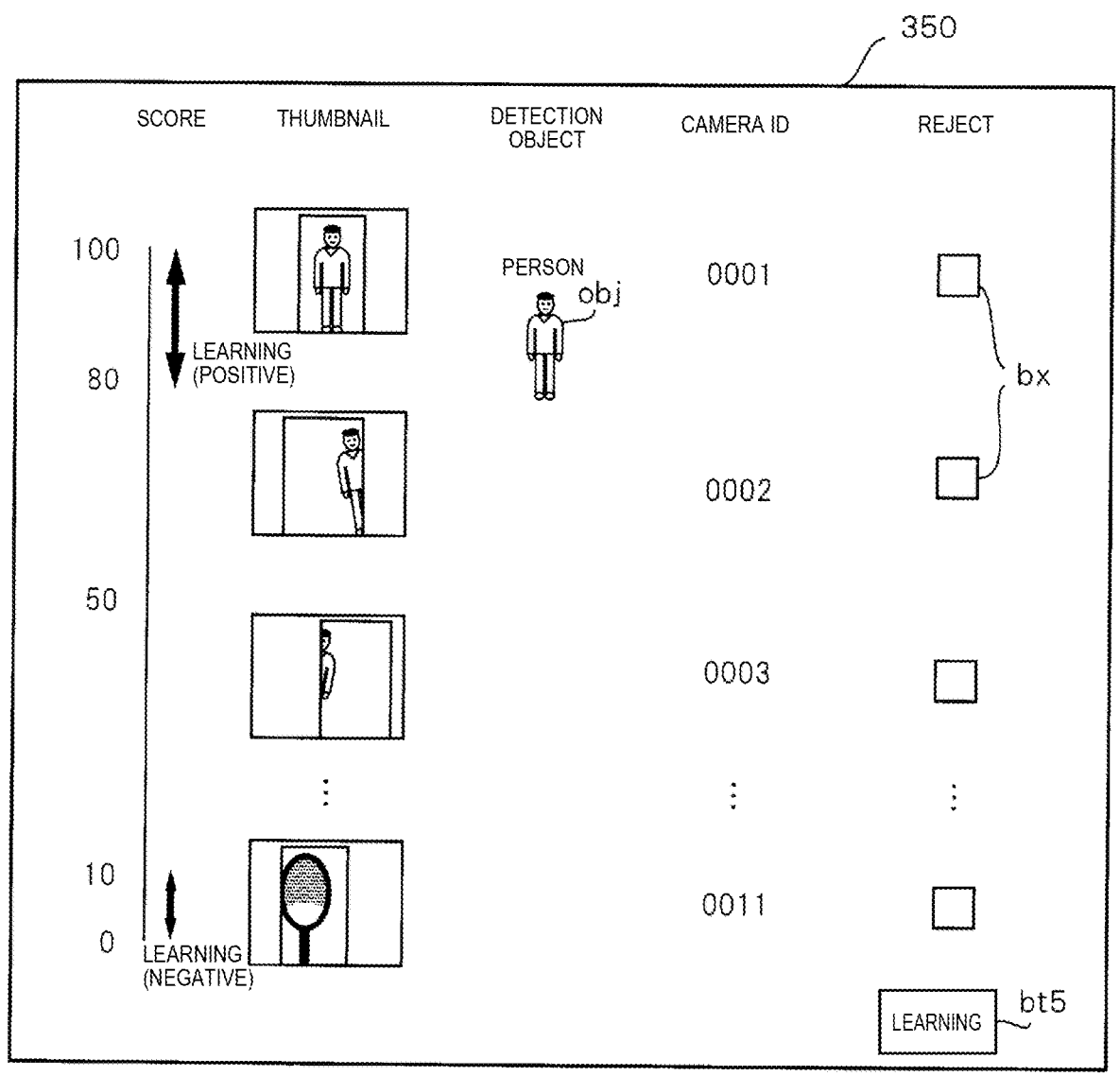
FIG. 18 is a diagram showing an example of a UI screen displayed on the display of the server at the time of integrated learning.

FIG. 18 is a diagram showing an example of UI screen 350 displayed on display 37 of server 30 at the time of integrated learning.

Server 30 can display UI screen 310 (see FIG. 18) at the integrated learning on display 37. On UI screen 350, a score, a thumbnail, a camera ID, and a reject button bx are displayed for each learning data cut out from the captured image data. Here, the case where the detection object is "person" is shown.

The score is digitized in the range of 0 to 100 points. For example, in a case where the object is "person", the score of the image data showing the person is high from 80 points to 100 points. On the other hand, the score of the image data showing not a person but "tree" is lower to 10 points. The thumbnail is a reduced image of the learning data. Since it is a thumbnail, when transmitting the thumbnail from camera 10 to server 30, the data transfer amount is suppressed. The camera ID is the identification information of the camera which captures an image for obtaining the learning data. Reject button bx is selected by the user and a check mark is displayed. The learning data, to which the check mark in reject button bx is added, is not used for learning in a case where the user presses learning button bt5.

Server 30 automatically does not perform learning adopting the captured image data with a higher score but performs learning excluding the captured image data with a lower score. However, for example, the user may instruct the captured image data to be used for learning by using reject button bx. For example, the user may give an instruction not to perform learning excluding the captured image data with a lower score but to perform learning adopting the captured image data with a higher score.

In this way, server 30 performs integrated learning of model parameters, so the accuracy of learning of model parameters is improved. Server 30 feedbacks the updated model parameter, which is the result of integrated learning, to corresponding camera 10. Accordingly, the more the regular report of the image data obtained by each camera 10, the higher the detection accuracy of the camera.

In addition, server 30 controls the feedback amount according to the number of regular reports of each camera 10 when feedbacking the updated model parameter, which is the result of integrated learning, to each camera 10. That is, server 30 transmits the updated model parameters such that the feedback amount (for example, the number of times of feedback) increases for camera 10 having a large number of false reports. Thus, the number of regular reports increases, and the detection accuracy of the camera improves.

On the other hand, server 30 transmits the updated model parameters such that the feedback amount (for example, the number of times of feedback) decreases for camera 10 having a small number of regular reports. Thus, the processing load on the camera can be reduced. Server 30 transmits the same updated model parameters to the cameras having the same installation environment to share the same, as described above.

Server 30 notifies each camera 10 of the processing amount of learning according to the number of regular reports of each camera 10, in a case of instructing each camera 10 to perform learning. Server 30 instructs camera 10 having a large number of false reports to perform learning such that the amount of learning increases. Thus, the number of regular reports increases, and the detection accuracy of the camera improves. On the other hand, server 30 instructs camera 10 with a large number of regular reports to perform learning such that the amount of learning is reduced. Thus, the processing load on the camera can be reduced.

Server 30 may integrate and manage the detection results of detecting the objects appearing in the images captured by respective cameras 10. In a case of integrating the detection results, the motion of the object may be represented by a vector and the detection result may be managed by a vector.

As described above, camera 10 according to Exemplary Embodiment 2 is a camera installed in surveillance area SA and used for surveillance system 5 communicably connected to server 30 to each other. Camera 10 captures the subject light from surveillance area SA in image sensor 12. Camera 10 detects at least one object appearing in the captured image by using captured image og based on the capturing of the subject light, in object inference function 141 as an example of the detection unit. Camera 10 retains a teacher data set prepared for each object type in teacher data set memory 151. Camera 10 derives a score indicating the detection accuracy of the detected object by using the teacher data set, in score derivation function 142 as an example of the derivation unit. Camera 10 learns a model parameter used for object detection according to the derived score, in parameter learning function 144 as an example of a parameter learning unit. Camera 10 registers and accumulates the learning results of the model parameter in parameter memory 152, in parameter learning function 144.

Thus, camera 10 can appropriately control the learning amount of parameters used in detection, according to the score indicating the detection accuracy of the object, which is obtained in the detection of at least one object in the captured image captured by the camera installed in the surveillance area, and improve learning accuracy in the camera.

Parameter learning function 144 performs learning to adopt the model parameter from which the score higher than the first predetermined value is derived. In this way, camera 10 performs learning to adopt the model parameter used for the inference of the object with a higher score, the model parameters applied to the estimation of the object with a high possibility of a regular report are used, and the learning accuracy of model parameters can be improved.

Parameter learning function 144 performs learning to exclude model parameters from which scores lower than the second predetermined value are derived. As described above, camera 10 performs learning to exclude the model parameters used for the inference of the object with a lower score, the model parameters applied to the estimation of the object with a high possibility of a false report are not used, and the learning accuracy of model parameters can be improved.

Parameter learning function 144 performs learning to adopt the model parameter from which the score higher than the first predetermined value is derived, and to exclude the model parameter from which the score lower than the second predetermined value is derived. As described above, camera 10 performs learning by combining the model parameter used for the inference of the object with a higher score and the model parameter used for the inference of the object with a lower score, and the learning accuracy of model parameters can be further improved.

While various exemplary embodiments have been described with reference to the drawings, it is to be understood that the present invention is not limited thereto. It is apparent to those skilled in the art that changes and modifications are conceivable within the scope described in the claims, and It would be appreciated that those naturally belong to the technical scope of the present invention. Further, within the scope not deviating from the gist of the invention, respective constituent elements in the above exemplary embodiment may be combined.

For example, in the above-described exemplary embodiment, the case is described in which the surveillance system is applied to a surveillance system for crime prevention that detects and tracks a suspicious person such as a thief, but the present invention may be applied to a surveillance system for product inspection in an unmanned automation (FA) production line or the like.

The present disclosure is useful as a surveillance system capable of suppressing an increase in traffic on a network and supporting reduction in a processing load of the server connected to a plurality of cameras.

What is claimed is:

1. A surveillance system comprising:
   a server; and
   a plurality of cameras provided in a surveillance area,
   wherein the server and the cameras are communicably connected to each other,
   wherein the server includes a memory that stores information regarding a processing capability of each of the cameras, information regarding an amount of free resources of each of the cameras, and a plurality of captured images obtained by capturing the surveillance area by each of the cameras,
   wherein the server includes a processor and the memory stores a program that, when executed by the processor, causes the server to:
      determine a first one of the cameras having at least a predetermined amount of free resources based on the information regarding the amount of free resources of each of the cameras,
      transmit, to the first one of the cameras, an instruction to execute a learning process that learns at least one parameter used for detecting at least one object, wherein the first one of the cameras executes the learning process that learns the at least one parameter used for detecting the at least one object, based on the instruction transmitted from the server,
      receive, from the first one of the cameras, the at least one parameter used for detecting the at least one object,
      calculate, based on the information regarding the amount of free resources of each of the cameras, a feedback amount of the at least one parameter used for detecting the at least one object, and
      transmit, to a second one of the cameras, data of a parameter corresponding to the feedback amount of the at least one parameter used for detecting the at least one object.

2. The surveillance system of claim 1,
   wherein the program, when executed by the processor, causes the server to:
   transmit, to the at least one of the cameras, an instruction to execute a detection process that detects the at least one object appearing in at least one of the captured images and the learning process that learns at least one parameter used for detecting the at least one object,
   wherein the at least one of the cameras executes the detection process on at least one of the captured images and executes the learning process that learns the at least one parameter used for detecting the at least one object, based on the instruction transmitted from the server.

3. The surveillance system of claim 2,
   wherein the server transmits the instruction to execute the learning process to each of the plurality of cameras,
   wherein each of the plurality of cameras executes the learning process according to the instruction to execute the learning process, and
   wherein the server receives results of the learning process executed by the plurality of cameras.

4. The surveillance system of claim 2,
   wherein the server executes the learning process, and transmits an instruction to execute the learning process to each of the plurality of cameras,
   wherein each of the plurality of cameras executes the learning process according to the instruction to execute the learning process, and
   wherein the server receives results of the learning process executed by the plurality of cameras.

5. The surveillance system of claim 3,
   wherein the server transmits the results of the learning process to each of the plurality of cameras, and
   wherein the plurality of cameras share the results of the learning process transmitted from the server.

6. The surveillance system of claim 5,
   wherein two or more of the plurality of cameras are installed under a same installation status,
   wherein the server transmits the results of the learning process to the two or more of the plurality of cameras, respectively, and
   wherein the two or more of the plurality of cameras share the results of the learning process transmitted from the server.

7. The surveillance system of claim 2,
   wherein the server controls a processing amount of the learning process, according to the number of objects detected by the camera.

8. The surveillance system of claim 7,
wherein the server controls the processing amount of the learning process in the camera, according to the number of regular reports or the number of false reports about detection of the objects detected by the camera.

9. The surveillance system of claim 2,
wherein the server controls a processing amount of the learning process in the cameras, according to information on processing capabilities of the cameras.

10. The surveillance system of claim 2,
wherein the server retains in the memory the information on the processing capability of each of the server and the plurality of cameras constituting the surveillance system, and controls a processing amount of the learning according to the information on the processing capability of each of the server and the plurality of cameras.

11. The surveillance system of claim 1,
wherein the learning process learns parameters used for detecting the at least one object appearing in at least one of the captured images, detects the at least one object appearing in at least one of the captured images, and analyzes the at least one object appearing in at least one of the captured images.

12. The surveillance system of claim 11,
wherein the server transmits the at least one of the captured images stored in the memory to the at least one of the cameras.

13. The surveillance system of claim 11,
wherein the server transmits the at least one of the captured images stored in the memory to the at least one of the camera, and transmits an instruction to execute a detection process that detects at least one object appearing in at least one of the captured images.

14. The surveillance system of claim 11,
wherein the server transmits the at least one of the captured images stored in the memory to the at least one of the cameras, and transmits an instruction to execute an analysis process that analyzes the at least one object appearing in at least one of the captured images.

15. The surveillance system of claim 1,
wherein the server transmits a detection result to each of the plurality of cameras.

16. The surveillance system of claim 2,
wherein the at least one of the cameras includes at least two of the cameras, and
wherein the server integrates two or more results of learning process executed process by the at least two of the cameras.

17. The surveillance system of claim 16,
wherein the at least two of the plurality of cameras are installed under a same installation status.

18. The surveillance system of claim 17,
wherein the server receives a notification of information on the installation status of each of the at least two of the plurality of cameras, from the at least two of the plurality of cameras.

19. The surveillance system of claim 1,
wherein the server and the plurality of cameras share information regarding costs of the plurality of cameras.

20. A surveillance method using a surveillance system in which a server and a plurality of cameras provided in a surveillance area are communicably connected to each other, the method comprising:
storing, by the server, in a memory information regarding a processing capability of each of the cameras, information regarding an amount of free resources of each of the cameras, and a plurality of captured images obtained by capturing the surveillance area by each of the cameras,
determining, by the server, a first one of the cameras having at least a predetermined amount of free resources based on the information regarding the amount of free resources of each of the cameras,
transmitting, by the server, an instruction to execute a learning process that learns at least one parameter used for detecting at least one object to a first one of the cameras,
learning, by the first one of the cameras, the at least one parameter used for detecting the at least one object, based on the instruction transmitted from the server,
transmitting, by the first one of the cameras, the at least one parameter used for detecting the at least one object to the server,
receiving, by the server, from the first one of the cameras, the at least one parameter used for detecting the at least one object,
calculating, by the server, based on the information regarding the amount of free resources of each of the cameras, a feedback amount of the at least one parameter used for detecting the at least one object, and
transmitting, by the server, to a second one of the cameras, data of a parameter corresponding to the feedback amount of the at least one parameter used for detecting the at least one object.

21. The surveillance system of claim 1,
wherein the second one of the cameras registers and stores the data of the parameter corresponding to the feedback amount of the at least one parameter used for detecting the at least one object.

* * * * *